(12) United States Patent
Mitsuhashi et al.

(10) Patent No.: US 10,865,312 B2
(45) Date of Patent: Dec. 15, 2020

(54) SURFACE TREATMENT AGENT

(71) Applicant: DAIKIN INDUSTRIES, LTD., Osaka (JP)

(72) Inventors: Hisashi Mitsuhashi, Settsu (JP); Kenichi Katsukawa, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/546,319

(22) PCT Filed: Nov. 26, 2015

(86) PCT No.: PCT/JP2015/083228
§ 371 (c)(1),
(2) Date: Jul. 26, 2017

(87) PCT Pub. No.: WO2016/121211
PCT Pub. Date: Aug. 4, 2016

(65) Prior Publication Data
US 2018/0030280 A1    Feb. 1, 2018

(30) Foreign Application Priority Data
Jan. 29, 2015 (JP) ................................. 2015-015715

(51) Int. Cl.
| | | |
|---|---|---|
| *C08G 65/00* | (2006.01) | |
| *C08G 65/30* | (2006.01) | |
| *C09D 4/00* | (2006.01) | |
| *C07F 7/18* | (2006.01) | |
| *C09D 5/00* | (2006.01) | |
| *C09K 3/18* | (2006.01) | |
| *C09D 5/16* | (2006.01) | |
| *C09D 171/02* | (2006.01) | |
| *C09D 183/12* | (2006.01) | |
| *C08G 65/336* | (2006.01) | |
| *C08G 77/24* | (2006.01) | |

(52) U.S. Cl.
CPC .............. *C09D 4/00* (2013.01); *C07F 7/1804* (2013.01); *C08G 65/007* (2013.01); *C08G 65/336* (2013.01); *C08G 77/24* (2013.01); *C09D 5/00* (2013.01); *C09D 5/16* (2013.01); *C09D 5/165* (2013.01); *C09D 5/1675* (2013.01); *C09D 171/02* (2013.01); *C09D 183/12* (2013.01); *C09K 3/18* (2013.01)

(58) Field of Classification Search
CPC ............................ C08G 65/336; C08G 65/007
See application file for complete search history.

(56) References Cited
U.S. PATENT DOCUMENTS

| | | | | |
|---|---|---|---|---|
| 3,810,874 | A | * | 5/1974 | Mitsch et al. ........ C07C 265/00 526/246 |
| 4,085,137 | A | * | 4/1978 | Mitsch ................. C07C 265/00 428/835.8 |
| 6,183,872 | B1 | | 2/2001 | Tanaka et al. |
| 6,337,135 | B1 | * | 1/2002 | Yamaguchi .......... C08G 65/007 427/299 |
| 9,975,993 | B2 | * | 5/2018 | Mitsuhashi ............... C09K 3/18 |
| 2009/0012220 | A1 | | 1/2009 | Yamane et al. |
| | | | (Continued) | |
| 2009/0143543 | A1 | * | 6/2009 | Yamane ................. C08L 83/12 525/474 |
| 2009/0208728 | A1 | | 8/2009 | Itami et al. |
| 2012/0077041 | A1 | * | 3/2012 | Yamane ............... C09D 171/02 428/421 |

FOREIGN PATENT DOCUMENTS

| | | |
|---|---|---|
| EP | 1351071 A2 | 10/2003 |
| EP | 2011831 A2 | 1/2009 |
| | (Continued) | |

OTHER PUBLICATIONS

International Search Report for PCT/JP2015/083228, dated Feb. 23, 2016.

(Continued)

*Primary Examiner* — Michael L Leonard
(74) *Attorney, Agent, or Firm* — Sughrue Mion, PLLC

(57) ABSTRACT

A surface-treating agent including at least one perfluoro(poly)ether group containing silane compound of any of the formulae (A1), (A2), (B1), (B2), (C1) and (C2):

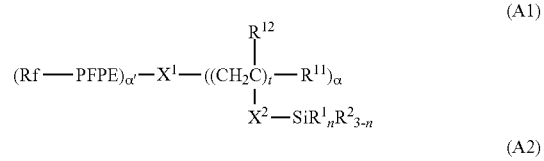

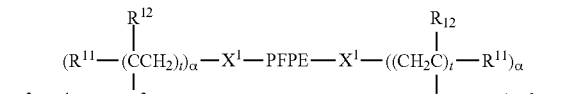

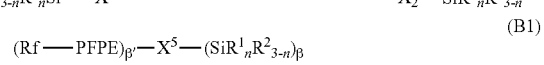

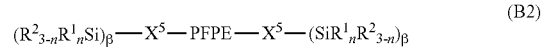

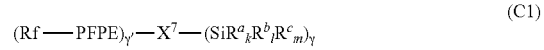

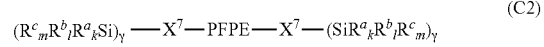

wherein, each of symbols is as defined in the specification, and wherein a proportion of the perfluoro(poly)ether group containing silane compound having a molecular weight of 3,000 or less in the perfluoro(poly)ether group containing silane compounds of any of the above general formulae is 9 mol % or less.

34 Claims, No Drawings

(56) References Cited

U.S. PATENT DOCUMENTS

| | | | |
|---|---|---|---|
| 2013/0303689 A1* | 11/2013 | Sato | C09D 183/08 524/588 |
| 2014/0287240 A1 | 9/2014 | Murotani et al. | |
| 2015/0118502 A1* | 4/2015 | Mitsuhashi | C08G 65/336 428/429 |
| 2015/0275046 A1* | 10/2015 | Yamane | C09D 183/12 428/429 |

FOREIGN PATENT DOCUMENTS

| | | | |
|---|---|---|---|
| EP | 2915833 A1 | 9/2015 | |
| EP | 3225646 A1 | 10/2017 | |
| JP | 10-237383 A | 9/1998 | |
| JP | 2005-290323 A | 10/2005 | |
| JP | 2006-113134 A | 4/2006 | |
| JP | 2008-534696 A | 8/2008 | |
| JP | 2009-30039 A | 2/2009 | |
| JP | 2014-015609 A | 1/2014 | |
| JP | 2014-080473 A | 5/2014 | |
| JP | 2014-191186 A | 10/2014 | |
| WO | 97/07155 A1 | 2/1997 | |
| WO | 2013/042732 A1 | 3/2013 | |
| WO | 2013/074299 A1 | 5/2013 | |
| WO | 2013/121986 A1 | 8/2013 | |
| WO | 2013/126208 A1 | 8/2013 | |
| WO | 2014/069592 A1 | 5/2014 | |
| WO | WO-2014069592 A1 * | 5/2014 | ........... C08G 65/336 |
| WO | WO-2015166760 A1 * | 11/2015 | ............... C09K 3/18 |

OTHER PUBLICATIONS

International Preliminary Report on Patentability dated Aug. 1, 2017, in counterpart International Application No. PCT/JP2015/083228.

Communication dated Jun. 8, 2018 from the European Patent Office in counterpart EP application No. 15880103.5.

Communication dated Oct. 7, 2020 from European Patent Office in EP Application No. 20176029.5.

* cited by examiner

SURFACE TREATMENT AGENT

This application is a National Stage of International Application No. PCT/JP2015/083228 filed Nov. 26, 2015, claiming priority based on Japanese Patent Application No. 2015-015715 filed Jan. 29, 2015, the contents of all of which are incorporated herein by reference in their entirety.

TECHNICAL FIELD

The present invention relates to a surface-treating agent, specifically, the surface-treating agent comprising a perfluoro(poly)ether group containing silane compound.

BACKGROUND ART

A certain fluorine-containing silane compound is known to be able to provide excellent water-repellency, oil-repellency, antifouling property, or the like when it is used in a surface treatment of a base material. A layer (hereinafter, referred to as a "surface-treating layer") formed from a surface-treating agent comprising a fluorine-containing silane compound is applied to various base materials such as a glass, a plastic, a fiber and a building material as a so-called functional thin film.

As such fluorine-containing silane compound, a perfluoropolyether group containing silane compound which has a perfluoropolyether group in its main molecular chain and a hydrolyzable group bonding to a Si atom in its molecular terminal or terminal portion is known. For example, Patent Documents 1 and 2 disclose a perfluoropolyether group containing silane compound having a hydrolyzable group bonding to a Si atom in its molecular terminal or terminal portion.

PRIOR ART DOCUMENT

Patent Document

Patent Document 1: International Publication No. 97/07155
Patent Document 2: JP 2008-534696 A

SUMMARY OF THE INVENTION

Problem to be Solved by the Invention

The surface-treating layer is requested for high durability to provide a base material with a desired function for a long time. The layer formed from the surface-treating agent containing the perfluoropolyether group containing silane compound has been suitably used in an optical member such as glasses, a touch panel or the like which is required to have light permeability or transparency since it can exert the above functions even in form of a thin film. In particular, in these applications, the friction durability is required to be further improved.

However, a layer formed from a surface-treating agent containing a conventional perfluoropolyether group containing silane compound described above is no longer necessarily enough to meet the increasing demand to improve the friction durability.

An object of the present invention is to provide a perfluoro(poly)ether group containing silane compound which is able to form a layer having water-repellency, oil-repellency and antifouling property, waterproof property as well as high friction durability.

Means to Solve the Problem

As a result of intensively studying, the inventors of the present invention have found that, in a surface-treating agent comprising the perfluoro(poly)ether group containing silane compound, by setting the proportion of the perfluoro(poly)ether group containing silane compound having a molecular weight of 3,000 or less in the perfluoro(poly)ether group containing silane compounds contained in the surface-treating agent, the surface-treating layer having more excellent friction durability can be formed, and the inventors reach the present invention.

Therefore, according to the first aspect of the present invention, there is provided a surface-treating agent comprising at least one perfluoro(poly)ether group containing silane compound of any of the formulae (A1), (A2), (B1), (B2), (C1) and (C2):

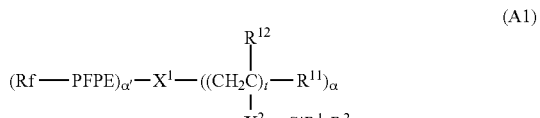

(A1)

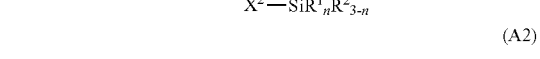

(A2)

(B1)

(B2)

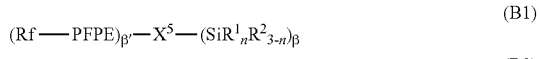

(C1)

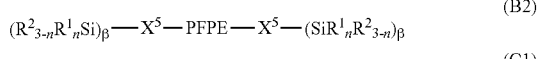

(C2)

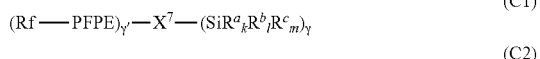

wherein:
PFPE is each independently at each occurrence a group of the formula:

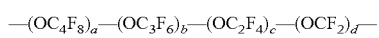

wherein a, b, c and d are each independently an integer of 0-200, the sum of a, b, c and d is 1 or more, and the occurrence order of the respective repeating units in parentheses with the subscript a, b, c or d is not limited in the formula;

Rf is each independently at each occurrence an alkyl group having 1-16 carbon atoms which may be substituted by one or more fluorine atoms;

$R^1$ is each independently at each occurrence a hydrogen atom or an alkyl group having 1-22 carbon atoms;

$R^2$ is each independently at each occurrence a hydroxyl group or a hydrolyzable group;

$R^{11}$ is each independently at each occurrence a hydrogen atom or a halogen atom;

$R^{12}$ is each independently at each occurrence a hydrogen atom or a lower alkyl group;

n is, independently per a unit ($—SiR^1_n R^2_{3-n}$), an integer of 0-3;

there is at least one $R^2$ in the formulae (A1), (A2), (B1) and (B2);

$X^1$ is each independently a single bond or a 2-10 valent organic group;

$X^2$ is each independently at each occurrence a single bond or a divalent organic group;

t is each independently at each occurrence an integer of 1-10;

α is each independently an integer of 1-9;

α' is each independently an integer of 1-9;

$X^5$ is each independently a single bond or a 2-10 valent organic group;

β is each independently an integer of 1-9;

β' is each independently an integer of 1-9;

$X^7$ is each independently a single bond or a 2-10 valent organic group;

γ is each independently an integer of 1-9;

γ' is each independently an integer of 1-9;

$R^a$ is each independently at each occurrence $-Z-SiR^{71}{}_p R^{72}{}_q R^{73}{}_r$;

Z is each independently at each occurrence an oxygen atom or a divalent organic group;

$R^{71}$ is each independently at each occurrence $R^{a'}$;

$R^{a'}$ has the same definition as that of $R^a$;

in $R^a$, the number of Si atoms which are straightly linked via the Z group is up to five;

$R^{72}$ is each independently at each occurrence a hydroxyl group or a hydrolyzable group;

$R^{73}$ is each independently at each occurrence a hydrogen atom or a lower alkyl group;

p is each independently at each occurrence an integer of 0-3;

q is each independently at each occurrence an integer of 0-3;

r is each independently at each occurrence an integer of 0-3;

in one $R^a$, the sum of p, q and r is 3, and there is at least one $R^{72}$ in the formula (C1) and (C2);

$R^b$ is each independently at each occurrence a hydroxyl group or a hydrolyzable group;

$R^c$ is each independently at each occurrence a hydrogen atom or a lower alkyl group;

k is each independently at each occurrence an integer of 1-3;

l is each independently at each occurrence an integer of 0-2;

m is each independently at each occurrence an integer of 0-2; and the sum of k, l and m is 3 in each unit in parentheses with the subscript γ, wherein a proportion of the perfluoro(poly)ether group containing silane compound having a molecular weight of 3,000 or less in the perfluoro(poly)ether group containing silane compounds of any of the above general formulae is 9 mol % or less.

According to the second aspect of the present invention, there is provided a pellet comprising the surface-treating agent described above.

According to the third aspect of the present invention, there is provided an article comprising a base material and a layer which is formed on a surface of the base material from the surface-treating agent comprising the perfluoro (poly)ether group containing silane compound described above.

Effect of the Invention

According to the present invention, there is provided a novel surface-treating agent comprising a perfluoropolyether group containing silane compound. By using the surface-treating agent, the surface-treating layer having water-repellency, oil-repellency and antifouling property as well as excellent friction durability can be formed.

EMBODIMENTS TO CARRY OUT THE INVENTION

Hereinafter, the compound of the present invention will be described.

A "hydrocarbon group" as used herein represents a group containing a carbon atom and a hydrogen atom which is obtained by removing a hydrogen atom from a hydrocarbon. Examples of the hydrocarbon group include, but are not particularly limited to, a hydrocarbon group having 1-20 carbon atoms which may be substituted with one or more substituents, for example, an aliphatic hydrocarbon group, an aromatic hydrocarbon group, and the like. The "aliphatic hydrocarbon group" may be straight, branched or cyclic, and may be saturated or unsaturated. The hydrocarbon group may contain one or more ring structures. It is noted that the hydrocarbon group may have one or more N, O, S, Si, amide, sulfonyl, siloxane, carbonyl, carbonyloxy, or the like at its end or in its molecular chain.

As used herein, examples of the substituent of the "hydrocarbon group" include, but are not particularly limited to, for example a halogen atom; and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5-10 membered heterocyclyl group, a 5-10 membered unsaturated heterocyclyl group, a $C_{6-10}$ aryl group, a 5-10 membered heteroaryl group, and the like, which may be substituted by one or more halogen atoms.

A "2-10 valent organic group" as used herein represents a 2-10 valent group containing a carbon atom. Examples of the 2-10 valent organic group include, but are not particularly limited to, a 2-10 valent group obtained by removing 1-9 hydrogen atoms from a hydrocarbon group. For example, examples of the divalent organic group include, but are not particularly limited to, a divalent group obtained by removing one hydrogen atom from a hydrocarbon group from a hydrocarbon group.

The present invention provides a surface-treating agent (hereinafter, referred to also as "the surface-treating agent of the present invention") comprising at least one perfluoro (poly)ether group containing silane compound of any of the following formulae (A1), (A2), (B1), (B2), (C1) and (C2) wherein a proportion of the perfluoro(poly)ether group containing silane compound having a molecular weight of 3,000 or less in the perfluoro(poly)ether group containing silane compounds of the general formulae is 9 mol % or less.

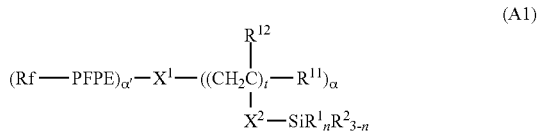

(A1)

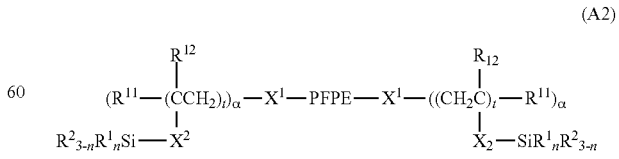

(A2)

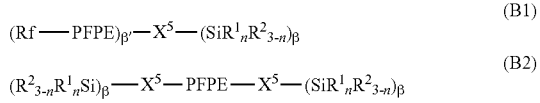

(B1)

(B2)

-continued

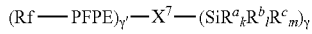

Hereinafter, the compound of the formulae (A1), (A2), (B), (B2), (C1) and (C2) described above are described.

Formulae (A1) and (A2):

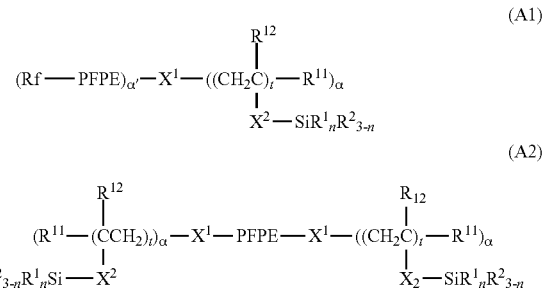

In the formula described above, PFPE is —$(OC_4F_8)_a$—$(OC_3F_6)_b$—$(OC_2F_4)_c$—$(OCF_2)_d$—, and corresponds to a perfluoro(poly)ether group. Herein, a, b, c and d are each independently 0 or an integer of 1 or more. The sum of a, b, c and d is 1 or more. Preferably, a, b, c and d are each independently an integer of 0 or more and 200 or less, for example an integer of 1 or more and 200 or less, more preferably each independently an integer of 0 or more and 100 or less. The sum of a, b, c and d is preferably 5 or more, more preferably 10 or more, for example 10 or more and 100 or less. The occurrence order of the respective repeating units in parentheses with the subscript a, b, c or d is not limited in the formula. Among these repeating units, the —$(OC_4F_8)$— group may be any of —$(OCF_2CF_2CF_2CF_2)$—, —$(OCF(CF_3)\ CF_2CF_2)$—, —$(OCF_2CF(CF_3)\ CF_2)$—, —$(OCF_2CF_2CF(CF_3))$—, —$(OC(CF_3)_2CF_2)$—, —$(OCF_2C(CF_3)_2)$—, —$(OCF(CF_3)\ CF(CF_3))$—, —$(OCF(C_2F_5)\ CF_2)$— and —$(OCF_2CF(C_2F_5))$—, preferably —$(OCF_2CF_2CF_2CF_2)$—. The —$(OC_3F_6)$— group may be any of —$(OCF_2CF_2CF_2)$—, —$(OCF(CF_3)\ CF_2)$— and —$(OCF_2CF(CF_3))$—, preferably —$(OCF_2CF_2CF_2)$—. The —$(OC_2F_4)$— group may be any of —$(OCF_2CF_2)$— and —$(OCF(CF_3))$—, preferably —$(OCF_2CF_2)$—.

In one embodiment, PFPE is —$(OC_3F_6)_b$— wherein b is an integer of 1 or more and 200 or less, preferably 5 or more and 200 or less, more preferably 10 or more and 200 or less, preferably —$(OCF_2CF_2CF_2)_b$— wherein b is an integer of 1 or more and 200 or less, preferably 5 or more and 200 or less, more preferably 10 or more and 200 or less, or —$(OCF(CF_3)CF_2)_b$— wherein b is an integer of 1 or more and 200 or less, preferably 5 or more and 200 or less, more preferably 10 or more and 200 or less, more preferably —$(OCF_2CF_2CF_2)_b$— wherein b is an integer of 1 or more and 200 or less, preferably 5 or more and 200 or less, more preferably 10 or more and 200 or less.

In another embodiment, PFPE is —$(OC_4F_8)_a$—$(OC_3F_6)_b$—$(OC_2F_4)_c$—$(OCF_2)_d$— wherein a and b are each independently an integer of 0 or more and 30 or less, c and d are each independently an integer of 1 or more and 200 or less, preferably 5 or more and 200 or less, more preferably 10 or more and 200 or less, and the occurrence order of the respective repeating units in parentheses with the subscript a, b, c or d is not limited in the formula; preferably —$(OCF_2CF_2CF_2CF_2)_a$—$(OCF_2CF_2CF_2)_b$—$(OCF_2CF_2)_c$—$(OCF_2)_d$—. In one embodiment, PFPE may be —$(OC_2F_4)_c$—$(OCF_2)_d$— wherein c and d are each independently an integer of 1 or more and 200 or less, preferably 5 or more and 200 or less, more preferably 10 or more and 200 or less, and the occurrence order of the respective repeating units in parentheses with the subscript c or d is not limited in the formula.

In further another embodiment, PFPE is a group of —$(OC_2F_4—R^8)_f$—. In the formula, $R^8$ is a group selected from $OC_2F_4$, $OC_3F_6$ and $OC_4F_8$, or a combination of 2 or 3 groups independently selected from these groups. Examples of the combination of 2 or 3 groups independently selected from $OC_2F_4$, $OC_3F_6$ and $OC_4F_8$ include, but not limited to, for example, —$OC_2F_4OC_3F_6$—, —$OC_2F_4OC_4F_8$—, —$OC_3F_6OC_2F_4$—, —$OC_3F_6OC_3F_6$—, —$OC_3F_6OC_4F_8$—, —$OC_4F_8OC_4F_8$—, —$OC_4F_8OC_3F_6$—, —$OC_4F_8OC_2F_4$—, —$OC_2F_4OC_2F_4OC_3F_6$—, —$OC_2F_4OC_2F_4OC_4F_8$—, —$OC_2F_4OC_3F_6OC_2F_4$—, —$OC_2F_4OC_3F_6OC_3F_6$—, —$OC_2F_4OC_4F_8OC_2F_4$—, —$OC_3F_6OC_2F_4OC_2F_4$—, —$OC_3F_6OC_2F_4OC_3F_6$—, —$OC_3F_6OC_3F_6OC_2F_4$—, —$OC_4F_8OC_2F_4OC_2F_4$—, and the like. f is an integer of 2-100, preferably an integer of 2-50. In the above-mentioned formula, $OC_2F_4$, $OC_3F_6$ and $OC_4F_8$ may be straight or branched, preferably straight. In this embodiment, PFPE is preferably —$(OC_2F_4—OC_3F_6)_f$— or —$(OC_2F_4—OC_4F_8)_f$—.

In the formula, Rf is an alkyl group having 1-16 carbon atoms which may be substituted by one or more fluorine atoms.

The "alkyl group having 1-16 carbon atoms" in the alkyl having 1-16 carbon atoms which may be substituted by one or more fluorine atoms may be straight or branched, and preferably is a straight or branched alkyl group having 1-6 carbon atoms, in particular 1-3 carbon atoms, more preferably a straight alkyl group having 1-3 carbon atoms.

Rf is preferably an alkyl having 1-16 carbon atoms substituted by one or more fluorine atoms, more preferably a $CF_2H$—$C_{1-15}$ fluoroalkylene group, more preferably a perfluoroalkyl group having 1-16 carbon atoms.

The perfluoroalkyl group having 1-16 carbon atoms may be straight or branched, and preferably is a straight or branched perfluoroalkyl group having 1-6 carbon atoms, in particular 1-3 carbon atoms, more preferably a straight perfluoroalkyl group having 1-3 carbon atoms, specifically —$CF_3$, —$CF_2CF_3$ or —$CF_2CF_2CF_3$.

In the formula, $R^1$ is each independently at each occurrence a hydrogen atom or an alkyl group having 1-22 carbon atoms preferably an alkyl group having 1-4 carbon atoms.

In the formula, $R^2$ is each independently at each occurrence a hydroxyl group or a hydrolyzable group.

The "hydrolyzable group" as used herein represents a group which is able to be removed from a backbone of a compound by a hydrolysis reaction. Examples of the hydrolyzable group include —OR, —OCOR, —O—N=$CR_2$, —$NR_2$, —NHR, halogen (wherein R is a substituted or non-substituted alkyl group having 1-4 carbon atoms), preferably —OR (i.e. an alkoxy group). Examples of R include a non-substituted alkyl group such as a methyl group, an ethyl group, a propyl group, an isopropyl group, an n-butyl group, an isobutyl group; and a substituted alkyl group such as a chloromethyl group. Among them, an alkyl group, in particular a non-substituted alkyl group is preferable, a methyl group or an ethyl group is more preferable. The hydroxyl group may be, but is not particularly limited to, a group generated by hydrolysis of a hydrolyzable group.

In the formula, $R^{11}$ is each independently at each occurrence a hydrogen atom or a halogen atom. The halogen atom is preferably an iodine atom, a chlorine atom, a fluorine atom, more preferably a fluorine atom.

In the formula, $R^{12}$ is each independently at each occurrence a hydrogen atom or a lower alkyl group. The lower alkyl group is preferably an alkyl group having 1-20 carbon atoms, more preferably an alkyl group having 1-6 carbon atoms, for example a methyl group, an ethyl group, an propyl group, or the like.

In the formula, n is, independently per a unit $(-SiR^1{}_nR^2{}_{3-n})$, an integer of 0-3, preferably 0-2, more preferably 0. All of n are not simultaneously 0 in the formula. In other words, at least one $R^2$ is present in the formula.

In the formula, $X^1$ is each independently a single bond or a 2-10 valent organic group. $X^1$ is recognized to be a linker which connects between a perfluoropolyether moiety (i.e., an Rf—PFPE moiety or —PFPE- moiety) providing mainly water-repellency, surface slip property and the like and a silane moiety (i.e., a group in parentheses with the subscript α) providing an ability to bind to a base material in the compound of the formula (A1) and (A2). Therefore, $X^1$ may be any organic group as long as the compound of the formula (A1) and (A2) can stably exist.

In the formula, α is an integer of 1-9, and α' is an integer of 1-9. α and α' may be varied depending on the valence number of the $X^1$ group. In the formula (A1), the sum of α and α' is the valence number of $X^1$. For example, when $X^1$ is a 10 valent organic group, the sum of α and α' is 10, for example, α is 9 and α' is 1, α is 5 and α' is 5, or α is 1 and α' is 9. When $X^1$ is a divalent organic group, a and α' are 1. In the formula (A2), α is a value obtained by subtracting 1 from the valence number of $X^1$.

$X^1$ is preferably a 2-7 valent, more preferably 2-4 valent, more preferably a divalent organic group.

In one embodiment, $X^1$ is a 2-4 valent organic group, a is 1-3, and α' is 1.

In another embodiment, $X^1$ is a divalent organic group, α is 1, and α' is 1. In this case, the formulae (A1) and (A2) are represented by the following formulae (A1') and (A2').

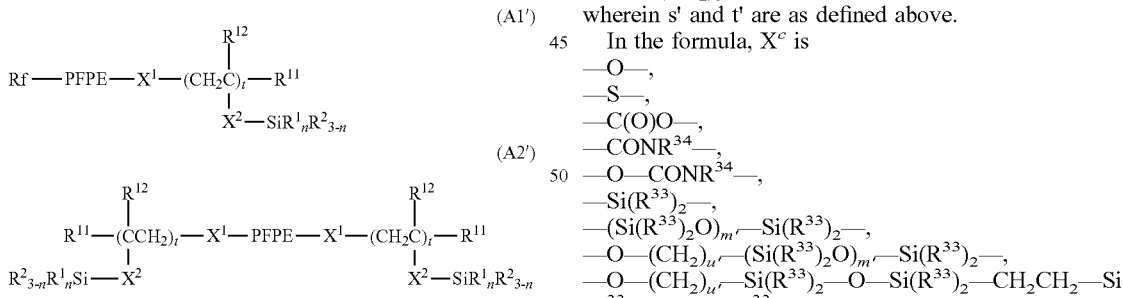

Examples of $X^1$ include, but are not particularly limited to, for example a divalent group of the following formula:

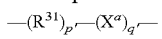

wherein:

$R^{31}$ is a single bond, $-(CH_2)_{s'}-$ or an o-, m- or p-phenylene group, preferably $-(CH_2)_{s'}-$, s' is an integer of 1-20, preferably an integer of 1-6, more preferably an integer of 1-3, further more preferably 1 or 2, $X^a$ is $-(X^b)_{l'}-$, $X^b$ is each independently at each occurrence a group selected from the group consisting of —O—, —S—, an o-, m- or p-phenylene group, —C(O)O—, —Si$(R^{33})_2$—, —(Si$(R^{33})_2$O$)_{m'}$—Si$(R^{33})_2$—, —CONR$^{34}$—, —O—CONR$^{34}$—, —NR$^{34}$— and —(CH$_2)_{n'}$—, $R^{33}$ is each independently at each occurrence a phenyl group, a $C_{1-6}$ alkyl group or a $C_{1-6}$ alkoxy group, preferably a phenyl group or a $C_{1-6}$ alkyl group, more preferably a methyl group, $R^{34}$ is each independently at each occurrence a hydrogen atom, a phenyl group or a $C_{1-6}$ alkyl group (preferably a methyl group), m' is each independently at each occurrence an integer of 1-100, preferably an integer of 1-20, n' is each independently at each occurrence an integer of 1-20, preferably an integer of 1-6, more preferably an integer of 1-3, l' is an integer of 1-10, preferably an integer of 1-5, more preferably an integer of 1-3, p' is 0 or 1, q' is 0 or 1, and at least one of p' and q' is 1, and the occurrence order of the respective repeating units in parentheses with the subscript p' or q' is not limited in the formula. Here, $R^{31}$ and $X^a$ (typically, a hydrogen atom in $R^{31}$ and $X^a$) may be substituted with one or more substituents selected from a fluorine atom, a $C_{1-3}$ alkyl group and a $C_{1-3}$ fluoroalkyl group.

Preferably, $X^1$ is $-(R^{31})_{p'}-(X^a)_{q'}-R^{32}-$. $R^{32}$ is a single bond, $-(CH_2)_{t'}-$ or an o-, m- or p-phenylene group, preferably $-(CH_2)_{t'}-$. t' is an integer of 1-20, preferably an integer of 2-6, more preferably an integer of 2-3. Here, $R^{32}$ (typically, a hydrogen atom in $R^{32}$) may be substituted with one or more substituents from a fluorine atom, a $C_{1-3}$ alkyl group and a $C_{1-3}$ fluoroalkyl group.

Preferably, $X^1$ may be a $C_{1-20}$ alkylene group, $-R^{31}-X^c-R^{32}-$, or $-X^d-R^{32}-$ wherein $R^{31}$ and $R^{32}$ are as defined above.

More preferably, $X^1$ may be a $C_{1-20}$ alkylene group, $-(CH_2)_{s'}-X^c-$, $-(CH_2)_{s'}-X^c-(CH_2)_{t'}-$ $-X^d-$, or $-X^d-(CH_2)_{t'}-$, wherein s' and t' are as defined above.

In the formula, $X^c$ is

—O—,

—S—,

—C(O)O—,

—CONR$^{34}$—,

—O—CONR$^{34}$—,

—Si$(R^{33})_2$—,

—(Si$(R^{33})_2$O$)_{m'}$—Si$(R^{33})_2$—,

—O—$(CH_2)_{u'}$—(Si$(R^{33})_2$O$)_{m'}$—Si$(R^{33})_2$—,

—O—$(CH_2)_{u'}$—Si$(R^{33})_2$—O—Si$(R^{33})_2$—CH$_2$CH$_2$—Si$(R^{33})_2$—O—Si$(R^{33})_2$—,

—O—$(CH_2)_{u'}$—Si(OCH$_3)_2$OSi(OCH$_3)_2$—,

—CONR$^{34}$—$(CH_2)_{u'}$—(Si$(R^{33})_2$O$)_{m'}$—Si$(R^{33})_2$—,

—CONR$^{34}$—$(CH_2)_{u'}$—N(R$^{34}$)—, or

—CONR$^{34}$-(o-, m- or p-phenylene)-Si$(R^{33})_2$— wherein $R^{33}$, $R^{34}$ and m' are as defined above, and u' is an integer of 1-20, preferably an integer of 2-6, more preferably an integer of 2-3. $X^c$ is preferably —O—.

In the formula, $X^d$ is

—S—,

—C(O)O—,

—CONR$^{34}$—,

—CONR$^{34}$—$(CH_2)_{u'}$—(Si$(R^{33})_2$O$)_{m'}$—Si$(R^{33})_2$—,

—CONR$^{34}$—(CH$_2$)$_{u'}$—N(R$^{34}$)—, or
—CONR$^{34}$-(o-, m- or p-phenylene)-Si(R$^{33}$)$_2$—
wherein each of symbols is as defined above.
  more preferably, X$^1$ is
a C$_{1-20}$ alkylene group,
—(CH$_2$)$_{s'}$—X$^c$—(CH$_2$)$_{t'}$— or
—X$^d$—(CH$_2$)$_{t'}$—,
wherein each of symbols is as defined above.
  Further more preferably, X$^1$ is
a C$_{1-20}$ alkylene group,
—(CH$_2$)$_{s'}$—O—(CH$_2$)$_{t'}$—,
—(CH$_2$)$_{s'}$—(Si(R$^{33}$)$_2$O)$_{m'}$—Si(R$^{33}$)$_2$—(CH$_2$)$_{t'}$—,
—(CH$_2$)$_{s'}$—O—(CH$_2$)$_{u'}$—Si(R$^{33}$)$_2$O)$_{m'}$—(R$^{33}$)$_2$
—(CH$_2$)$_{t'}$— or
—(CH$_2$)$_{s'}$—O—(CH$_2$)$_{t'}$—Si(R$^{33}$)$_2$—(CH$_2$)$_{u'}$—Si(R$^{33}$)$_2$—
(C$_v$H$_{2v}$)—
wherein R$^{33}$, m', s', t' and u' are as defined above, and v is an integer of 1-20, preferably an integer of 2-6, more preferably an integer of 2-3.

In the formula, —(C$_v$H$_{2v}$)— may be straight or branched, for example, may be, for example, —CH$_2$CH$_2$—, —CH$_2$CH$_2$CH$_2$—, —CH(CH$_3$)—, —CH(CH$_3$)CH$_2$—.

X$^1$ may be substituted with one or more substituents selected from a fluorine atom, a C$_{1-3}$ alkyl group and a C$_{1-3}$ fluoroalkyl group (preferably, a C$_{1-3}$ perfluoroalkyl group)

In another embodiment, examples of X$^1$ include, for example, the following groups:

—D—Si(R$^{41}$)$_2$—O—Si(R$^{41}$)$_2$—E—

—D—Si(R$^{41}$)$_2$—O—Si(R$^{41}$)$_2$—O—Si(R$^{41}$)$_2$—E—

—D—Si(R$^{41}$)$_2$—O—Si(R$^{41}$)$_2$—O—Si(R$^{41}$)$_2$—O—Si(R$^{41}$)$_2$—E—

—D—Si(R$^{41}$)$_2$—O—Si(R$^{41}$)$_2$—O—Si(R$^{41}$)$_2$—O—Si(R$^{41}$)$_2$—O—Si(R$^{41}$)$_2$—E—

—D—Si(R$^{41}$)$_2$—CH$_2$CH$_2$—Si(R$^{41}$)$_2$—E—

—D—Si(R$^{41}$)$_2$—(phenylene)—Si(R$^{41}$)$_2$—E—

—D—Si(R$^{41}$)$_2$—(bicyclic alkylene)—Si(R$^{41}$)$_2$—E— wherein R$^{41}$ is each independently a hydrogen atom, a phenyl group, an alkyl group having 1-6 carbon atoms, or a C$_{1-6}$ alkoxy group, preferably a methyl group;
D is a group selected from:
—CH$_2$O(CH$_2$)$_2$—,
—CH$_2$O(CH$_2$)$_3$—,
—CF$_2$O(CH$_2$)$_3$—,
—(CH$_2$)$_2$—,
—(CH$_2$)$_3$—,
—(CH$_2$)$_4$—,
—CONH—(CH$_2$)$_3$—,
—CON(CH$_3$)—(CH$_2$)$_3$—,
—CON(Ph)-(CH$_2$)$_3$— (wherein Ph is a phenyl group), and —C(O)—N(R$^{42}$)—(phenylene)—Si(R$^{42}$)$_2$—CH$_2$CH$_2$— wherein R$^{42}$ is each independently a hydrogen atom, a C$_{1-6}$ alkyl group, or a C$_{1-6}$ alkoxy group, preferably a methyl group or a methoxy group, more preferably a methyl group,
E is —(CH$_2$)$_n$— wherein n is an integer of 2-6, and
D binds to PFPE of the main backbone, and E binds to a group opposite to PFPE.

Specific examples of X$^1$ include, for example:
—CH$_2$O(CH$_2$)$_2$—,
—CH$_2$O(CH$_2$)$_3$—,
—CH$_2$O(CH$_2$)$_6$—,
—CH$_2$O(CH$_2$)$_3$Si(CH$_3$)$_2$OSi(CH$_3$)$_2$(CH$_2$)$_2$—,
—CH$_2$O(CH$_2$)$_3$Si(CH$_3$)$_2$OSi(CH$_3$)$_2$OSi(CH$_3$)$_2$(CH$_2$)$_2$—,
—CH$_2$O(CH$_2$)$_3$Si(CH$_3$)$_2$O(Si(CH$_3$)$_2$O)$_2$Si(CH$_3$)$_2$(CH$_2$)$_2$—,
—CH$_2$O(CH$_2$)$_3$Si(CH$_3$)$_2$O(Si(CH$_3$)$_2$O)$_3$Si(CH$_3$)$_2$(CH$_2$)$_2$—,
—CH$_2$O(CH$_2$)$_3$Si(CH$_3$)$_2$O(Si(CH$_3$)$_2$O)$_{10}$Si(CH$_3$)$_2$(CH$_2$)$_2$—,
—CH$_2$O(CH$_2$)$_3$Si(CH$_3$)$_2$O(Si(CH$_3$)$_2$O)$_{20}$Si(CH$_3$)$_2$(CH$_2$)$_2$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$) CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$) CF$_2$OCF$_2$—,
—CH$_2$OCH$_2$CHFCF$_2$OCF(CF$_3$) CF$_2$OCF$_2$CF$_2$—,
—CH$_2$OCH$_2$CHFCF$_2$OCF(CF$_3$) CF$_2$OCF$_2$CF$_2$CF$_2$—,
—CH$_2$OCH$_2$(CH$_2$)$_7$CH$_2$Si(OCH$_3$)$_2$OSi(OCH$_3$)$_2$(CH$_2$)$_2$Si(OCH$_3$)$_2$OSi(OCH$_3$)$_2$(CH$_2$)$_2$—,
—CH$_2$OCH$_2$CH$_2$CH$_2$Si(OCH$_3$)$_2$OSi(OCH$_3$)$_2$(CH$_2$)$_3$—,
—CH$_2$OCH$_2$CH$_2$CH$_2$Si(OCH$_2$CH$_3$)$_2$OSi(OCH$_2$CH$_3$)$_2$(CH$_2$)$_3$—,
—CH$_2$OCH$_2$CH$_2$CH$_2$Si(OCH$_3$)$_2$OSi(OCH$_3$)$_2$(CH)$_2$—,
—CH$_2$OCH$_2$CH$_2$CH$_2$Si(OCH$_2$CH$_3$)$_2$OSi(OCH$_2$CH$_3$)$_2$(CH$_2$)$_2$—,
—(CH$_2$)$_2$—,
—(CH$_2$)$_3$—,
—(CH$_2$)$_4$—,
—(CH$_2$)$_6$—,
—(CH$_2$)$_2$—Si(CH$_3$)$_2$—(CH$_2$)$_2$—
—CONH—(CH$_2$)$_3$—,
—CON(CH$_3$)—(CH$_2$)$_3$—,
—CON(Ph)-(CH$_2$)$_3$— (wherein Ph is phenyl),
—CONH—(CH$_2$)$_6$—, —CON(CH$_3$)—(CH$_2$)$_6$—,
—CON(Ph)-(CH$_2$)$_6$— (wherein Ph is phenyl),
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—S—(CH$_2$)$_3$—,
—(CH$_2$)$_2$S(CH$_2$)$_3$—,
—CONH—(CH$_2$)$_3$Si(CH$_3$)$_2$OSi(CH$_3$)$_2$(CH$_2$)$_2$—,
—CONH—(CH$_2$)$_3$Si CH$_3$)$_2$OSi(CH$_3$)$_2$OSi(CH$_3$)$_2$(CH$_2$)$_2$—,
—CONH—(CH$_2$)$_3$Si(CH$_3$)$_2$O(Si(CH$_3$)$_2$O)$_2$Si(CH$_3$)$_2$(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_{20}$Si(CH$_3$)$_2$(CH$_2$)$_2$—,
—C(O)O—(CH$_2$)$_3$,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(CH$_3$)—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,

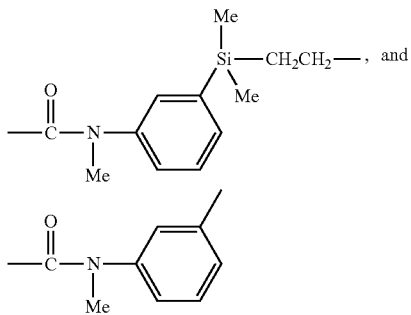

In another preferable embodiment, $X^1$ is a group of the formula: —(R$^{16}$)$_x$—(CFR$^{17}$)$_y$—(CH$_2$)$_z$—. In the formula, x, y and z are each independently an integer of 0-10, the sum of x, y and z is 1 or more, and the occurrence order of the respective repeating units in parentheses is not limited in the formula.

In the formula, $R^{16}$ is each independently at each occurrence an oxygen atom, phenylene, carbazolylene, —NR$^{26}$— (wherein $R^{26}$ is a hydrogen atom or an organic group) or a divalent organic group. Preferably, $R^{16}$ is an oxygen atom or a divalent polar group.

Examples of the "divalent polar group" include, but are not particularly limited to, —C(O)—, —C(=NR$^{27}$)—, and —C(O)NR$^{27}$— wherein $R^{27}$ is a hydrogen atom or a lower alkyl group. The "lower alkyl group" is, for example, an alkyl group having 1-6 carbon atoms, for example, methyl, ethyl, n-propyl, which may be substituted by one or more fluorine atoms.

In the formula, $R^{17}$ is each independently at each occurrence a hydrogen atom, a fluorine atom or a lower fluoroalkyl group, preferably a fluorine atom. The "lower fluoroalkyl group" is, for example, preferably a fluoroalkyl group having 1-6 carbon atoms, preferably 1-3 carbon atoms, preferably a perfluoroalkyl group having 1-3 carbon atoms, more preferably a trifluoromethyl group, and a pentafluoroethyl group, further preferably a trifluoromethyl group.

In this embodiment, $X^1$ is preferably is a group of the formula: —(O)$_x$—(CF$_2$)$_y$—(CH$_2$)$_z$— wherein x, y and z are as defined above, and the occurrence order of the respective repeating units in parentheses is not limited in the formula.

Examples of the group of the formula: —(O)$_x$—(CF$_2$)$_y$—(CH$_2$)$_z$— include, for example, —(O)$_{x'}$—(CH$_2$)$_{z''}$—O—[(CH$_2$)$_{z'''}$—O—]$_{z''''}$, and —(O)$_{x'}$—(CF$_2$)$_{y''}$—(CH$_2$)$_{z''}$—O—(CH$_2$)$_{z'''}$—O—[(CH$_2$)$_{z''''}$—O—]$_{z'''''}$ wherein x' is 0 or 1, y", z" and z''' are each independently an integer of 1-10, and z'''' is 0 or 1. It is noted that these groups are attached to PFPE at its left side terminal.

In another preferable embodiment, $X^1$ is —O—CFR$^{13}$—(CF$_2$)$_e$—.

$R^{13}$ is each independently a fluorine atom or a lower fluoroalkyl group. The lower fluoroalkyl group is, for example, a fluoroalkyl group having 1-3 carbon atoms, preferably a perfluoroalkyl group having 1-3 carbon atoms, more preferably a trifluoromethyl group, and a pentafluoroethyl group, further preferably a trifluoromethyl group.

e is each independently 0 or 1.

In one embodiment, $R^{13}$ is a fluorine atom, and e is 1.

In another embodiment, examples of $X^1$ include the following groups:

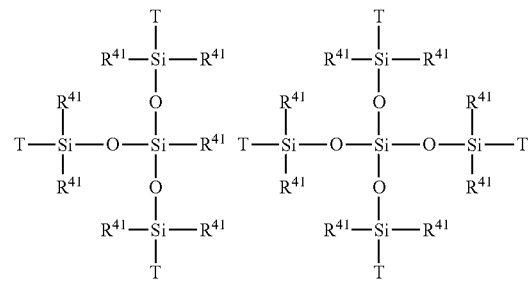

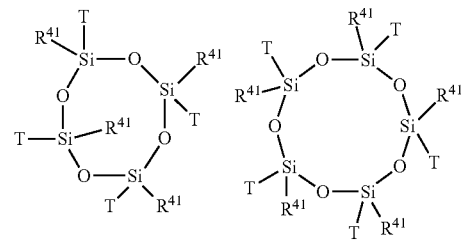

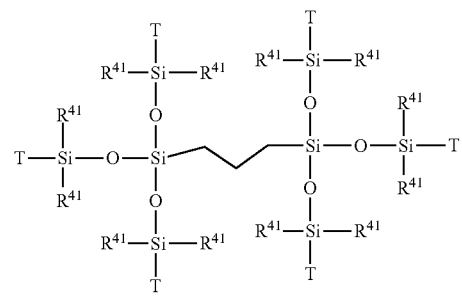

-continued

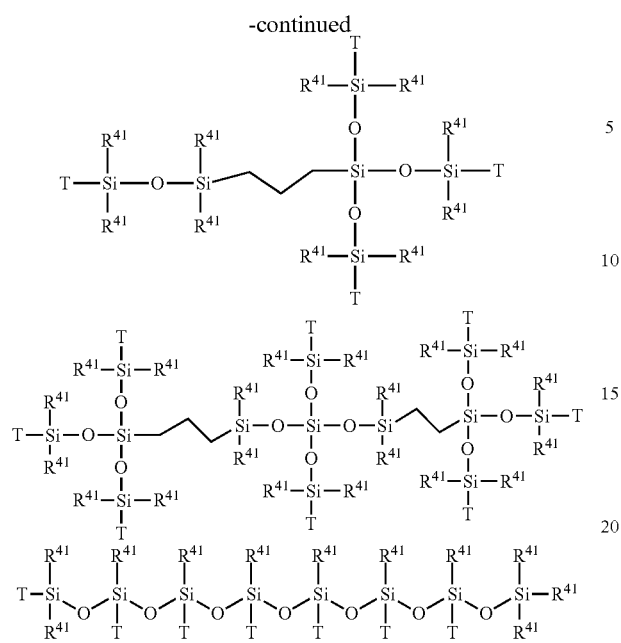

wherein R$^{41}$ is each independently a hydrogen atom, a phenyl group, an alkyl group having 1-6 carbon atoms, or a C$_{1-6}$ alkoxy group, preferably a methyl group;

in each X$^1$, some of T are a following group which binds to PFPE of the main backbone:
—CH$_2$O(CH$_2$)$_2$—,
—CH$_2$O(CH$_2$)$_3$—,
—CF$_2$O(CH$_2$)$_3$—,
—(CH$_2$)$_2$—,
—(CH$_2$)$_3$—,
—(CH$_2$)$_4$—,
—CONH—(CH$_2$)$_3$—,
—CON(CH$_3$)—(CH$_2$)$_3$—,
—CON(Ph)-(CH$_2$)$_3$— (wherein Ph is phenyl), or

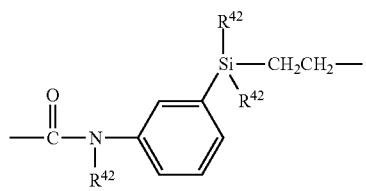

wherein R$^{42}$ is each independently a hydrogen atom, a C$_{1-6}$ alkyl group, or a C$_{1-6}$ alkoxy group, preferably a methyl group or a methoxy group, more preferably a methyl group, some of the other T are —(CH$_2$)$_{n''}$— (wherein n'' is an integer of 2-6) attached to the group opposite to PFPE which is a molecular backbone (i.e., a carbon atom in the formulae (A1) and (A2), and a Si atom in the formulae (B1), (B2), (C1) and (C2)), and the others T are each independently a methyl group, a phenyl group, or a C$_{1-6}$ alkoxy or a radical scavenger group or an ultraviolet ray absorbing group, if present.

The radical scavenger group is not limited as long as it can trap a radical generated by light irradiation, and includes, for example, a residue of benzophenones, benzotriazoles, benzoic esters, phenyl salicylates, crotonic acids, malonic esters, organoacrylates, hindered amines, hindered phenols, or triazines.

The ultraviolet ray absorbing group is not limited as long as it can absorb an ultraviolet ray, and includes, for example, benzotriazoles, hydroxybenzophenones, esters of benzoic acid or salicylic acid, acrylates, alkoxycinnamates, oxamides, oxanilides, benzoxazinones, or benzoxazoles.

In a preferable embodiment, examples of the radical scavenger group or the ultraviolet ray absorbing group include:

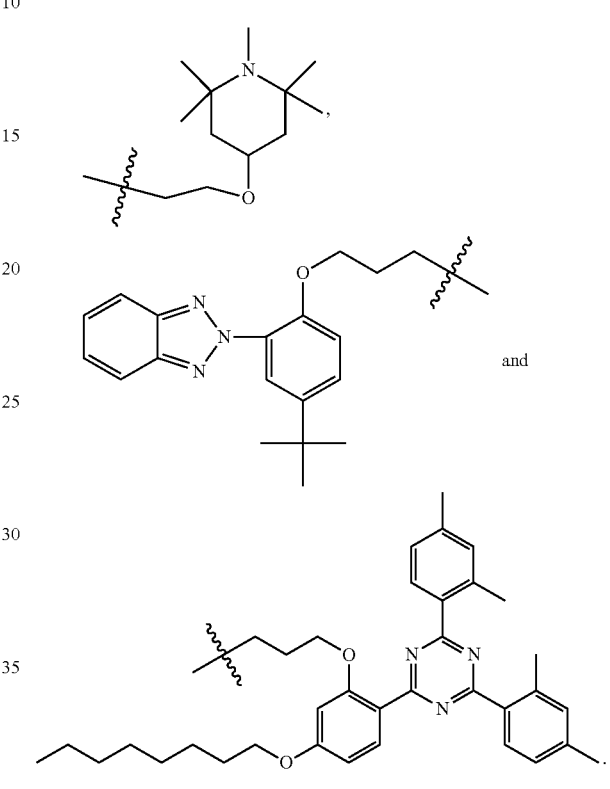

In this embodiment, X$^1$, X$^5$ and X$^7$ may be each independently a 3-10 valent organic group.

In the formula, t is each independently an integer of 1-10. In a preferable embodiment, t is an integer of 1-6. In another preferable embodiment, t is an integer of 2-10, preferably an integer of 2-6.

In the formula, X$^2$ is each independently at each occurrence a single bond or a divalent organic group. X$^2$ is preferably an alkylene group having 1-20 carbon atoms, more preferably —(CH$_2$)$_u$— wherein u is an integer of 0-2.

The preferable compound of the formulae (A1) and (A2) is a compound of the formula (A1') and (A2'):

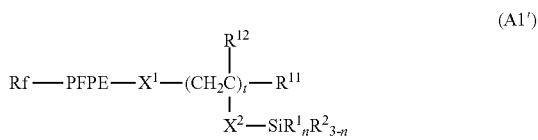

(A1')

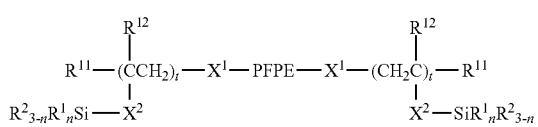

(A2')

wherein:

PFPE is each independently a group of the formula:

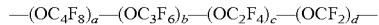

wherein a, b, c and d are each independently an integer of 0-200, the sum of a, b, c and d is one or more, and the occurrence order of the respective repeating units in parentheses with the subscript a, b, c or d is not limited in the formula, Rf is each independently at each occurrence an alkyl group having 1-16 carbon atoms which may be substituted by one or more fluorine atoms;

$R^1$ is each independently at each occurrence a hydrogen atom or an alkyl group having 1-22 carbon atoms;

$R^2$ is each independently at each occurrence a hydroxyl group or a hydrolyzable group;

$R^{11}$ is each independently at each occurrence a hydrogen atom or a halogen atom;

$R^{12}$ is each independently at each occurrence a hydrogen atom or a lower alkyl group;

n is an integer of 0-2, preferably 0;

$X^1$ is —O—$CFR^{13}$—$(CF_2)_e$—;

$R^{13}$ is a fluorine atom or a lower fluoroalkyl group;

e is 0 or 1;

$X^2$ is —$(CH_2)_u$—;

u is an integer of 0-2 (when u is 0, $X^2$ is a single bond); and t is an integer of 1-10.

The compound of the formulae (A1) and (A2) can be obtained for example by introducing an iodine into in the end of a perfluoropolyether derivative corresponding to the Rf—PFPE moiety as a raw material, and then reacting it with a vinyl monomer corresponding to —$CH_2CR^{12}(X^2$—$SiR^1{}_nR^2{}_{3-n})$—.

Formulae (B1) and (B2):

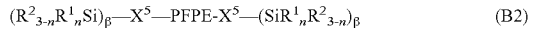

In the formulae (B1) and (B2), Rf, PFPE, $R^1$, $R^2$ and n are as defined above for the formulae (A1) and (A2).

In the formula, $X^5$ is each independently a single bond or a 2-10 valent organic group. $X^5$ is recognized to be a linker which connects between a perfluoropolyether moiety (i.e., an Rf—PFPE moiety or —PFPE- moiety) providing mainly water-repellency, surface slip property and the like and a silane moiety (specifically, —$SiR^1{}_nR^2{}_{3-n}$) providing an ability to bind to a base material in the compound of the formulae (B1) and (B2). Therefore, $X^5$ may be any organic group as long as the compound of the formula (B1) and (B2) can stably exist.

In the formula, β is an integer of 1-9, and β' is an integer of 1-9. β and β' may be determined depending on the valence number of $X^5$, and in the formula (B1), the sum of β and β' is the valence number of $X^5$. For example, when $X^5$ is a 10 valent organic group, the sum of β and β' is 10, for example, β is 9 and β' is 1, β is 5 and β' is 5, or β is 1 and β' is 9. When $X^5$ is a divalent organic group, β and β' are 1. In the formula (B2), β is a value obtained by subtracting 1 from the valence number of $X^5$.

$X^5$ is preferably a 2-7 valent, more preferably a 2-4 valent, further preferably a divalent organic group.

In one embodiment, $X^5$ is a 2-4 valent organic group, β is 1-3, and β' is 1.

In another embodiment, $X^5$ is a divalent organic group, β is 1, and β' is 1. In this case, the formulae (B1) and (B2) are represented by the following formulae (B1) and (B2').

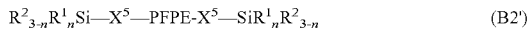

Examples of $X^5$ include, but are not particularly limited to, for example, the same group as those described for $X^1$.

Among them, a preferable specific embodiment of $X^5$ includes:

—$CH_2O(CH_2)_2$,
—$CH_2O(CH_2)_3$—,
—$CH_2O(CH_2)_6$—,
—$CH_2O(CH_2)_3Si(CH_3)_2OSi(CH_3)_2(CH_2)_2$—,
—$CH_2O(CH_2)_3Si(CH_3)_2OSi(CH_3)_2OSi(CH_3)_2(CH_2)_2$—,
—$CH_2O(CH_2)_3Si(CH_3)_2O(Si(CH_3)_2O)_2Si(CH_3)_2(CH_2)_2$—,
—$CH_2O(CH_2)_3Si(CH_3)_2O(Si(CH_3)_2O)_3Si(CH_3)_2(CH_2)_2$—,
—$CH_2O(CH_2)_3Si(CH_3)_2O(Si(CH_3)_2O)_{10}Si(CH_3)_2(CH_2)_2$-r
—$CH_2O(CH_2)_3Si(CH_3)_2O(Si(CH_3)_2O)_{20}Si(CH_3)_2(CH_2)_2$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2)OCF_2CF_2$—,
—$CH_2OCH_2CF_2CF_2)OCF_2CF_2CF_2$—,
—$CH_2OCH_2CF_2CF_2OCF(CF_3)\ CF_2OCF_2$—,
—$CH_2OCH_2CF_2CF_2OCF(CF_3)\ CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2)OCF_2CF_2$—,
—$CH_2OCH_2CHFCF_2)OCF_2CF_2CF_2$—,
—$CH_2OCH_2CHFCF_2OCF(CF_3)\ CF_2OCF_2$—,
—$CH_2OCH_2CHFCF_2OCF(CF_3)CF_2OCF_2CF_2$—,
—$CH_2OCH_2CHFCF_2OCF(CF_3)\ CF_2OCF_2CF_2CF_2$—
—$CH_2OCH_2(CH_2)_7CH_2Si(OCH_3)_2OSi(OCH_3)_2(CH_2)_2Si(OCH_3)_2OSi(OCH_3)_2(CH_2)_2$—,
—$CH_2OCH_2CH_2CH_2Si(OCH_3)_2OSi(OCH_3)_2(CH_2)_3$—,
—$CH_2OCH_2CH_2CH_2Si(OCH_2CH_3)_2OSi(CH_2CH_3)_2(CH_2)_3$—,
—$CH_2OCH_2CH_2Si(OCH_3)_2OSi(OCH_3)_2(CH_2)_2$—,
—$CH_2OCH_2CH_2CH_2Si(OCH_2CH_3)_2Si(OCH_2CH_3)_2(CH_2)_2$—,
—$(CH_2)_2$—,
—$(CH_2)_3$—,
—$(CH_2)_4$—,
—$(CH_2)_6$—,
—$(CH_2)_2$—$Si(CH_3)_2(CH_2)_2$—,
—$CONH$—$(CH_2)_3$—,
—$CON(CH_3)$—$(CH_2)_3$—,
—$CON(Ph)$-$(CH_2)_3$— (wherein Ph is phenyl),
—$CONH$—$(CH_2)_6$—,
—$CON(CH_3)$—$(CH_2)_6$,
—$CON(Ph)$-$(CH_2)_6$— (wherein Ph is phenyl),
—$CONH$—$(CH_2)_2NH(CH_2)_3$—,
—$CONH$—$(CH_2)_6NH(CH_2)_3$)
—$CH_2O$—$CONH$—$(CH_2)_3$—,
—$CH_2O$—$CONH$—$(CH_2)_6$—,
—$S$—$(CH_2)_3$—,
—$(CH_2)_2S(CH_2)_3$—,
—$CONH$—$(CH_2)_3Si(CH_3)_2OSi(CH_3)_2(CH_2)_2$—,
—$CONH$—$(CH_2)_3Si(CH_3)_2OSi(CH_3)_2OSi(CH_3)_2(CH_2)_2$—,
—$CONH$—$(CH_2)_3Si(CH_3)_2O(Si(CH_3)_2O)_2Si(CH_3)_2(CH_2)_2$—,
—$CONH$—$(CH_2)_3Si(CH_3)_2O(Si(CH_3)_2O)_3Si(CH_3)_2(CH_2)_2$—,
—$CONH$—$(CH_2)_3Si(CH_3)_2O(Si(CH_3)_2O)_{10}Si(CH_3)_2(CH_2)_2$—, —CONH—(CH$_2$)$_3$Si(CH$_3$)$_2$O(Si(CH$_3$)$_2$O)$_{20}$Si(CH$_3$)$_2$(CH$_2$)$_2$—,
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(CH$_3$)$_2$—(CH$_2$)$_2$—Si(CH$_3$)$_2$—CH(CH$_3$)$_2$—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,

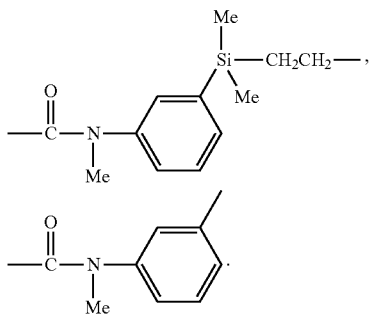

The preferable compound of the formulae (B1) and (B2) is a compound of the formula (B1') and (B2'):

$$\text{Rf—PFPE-X}^5\text{—SiR}^1{}_n\text{R}^2{}_{3-n} \quad (B1')$$

$$\text{R}^2{}_{3-n}\text{R}^1{}_n\text{Si—X}^5\text{—PFPE-X}^5\text{—SiR}^1{}_n\text{R}^2{}_{3-n} \quad (B2')$$

wherein:
PFPE is each independently a group of the formula:

$$-(\text{OC}_4\text{F}_8)_a-(\text{OC}_3\text{F}_6)_b-(\text{OC}_2\text{F}_4)_c-(\text{OCF}_2)_d-$$

wherein a, b, c and d are each independently an integer of 0-200, the sum of a, b, c and d is one or more, and the occurrence order of the respective repeating units in parentheses with the subscript a, b, c or d is not limited in the formula, Rf is each independently at each occurrence an alkyl group having 1-16 carbon atoms which may be substituted by one or more fluorine atoms;

$R^1$ is each independently at each occurrence a hydrogen atom or an alkyl group having 1-22 carbon atoms;

$R^2$ is each independently at each occurrence a hydroxyl group or a hydrolyzable group;

n is an integer of 0-2, preferably 0; and $X^5$ is —CH$_2$O(CH$_2$)$_2$—, —CH$_2$O(CH$_2$)$_3$— or CH$_2$O(CH$_2$)$_6$—.

The compound of the formulae (B1) and (B2) can be prepared by a known method, for example, a method described in Patent Document 1 or the modified method thereof. For example, the compound of the formulae (B1) and (B2) can be prepared by reacting a compound of the formula (B1-4) or (B2-4):

$$(\text{Rf—PFPE})_{\beta'}\text{—X}^{5'}\text{—(R}^{82}\text{—CH=CH}_2)_\beta \quad (B1\text{-}4)$$

$$(\text{CH}_2\text{=CH—R}^{82})_\beta\text{—X}^{5'}\text{—PFPE-X}^{5'}\text{—R}^{82}\text{—CH=CH}_2)_\beta \quad (B2\text{-}4)$$

wherein:
PFPE is each independently a group of the formula:

$$-(\text{OC}_4\text{F}_8)_a-(\text{OC}_3\text{F}_6)_b-(\text{OC}_2\text{F}_4)_c-(\text{OCF}_2)_d-$$

wherein a, b, c and d are each independently an integer of 0-200, the sum of a, b, c and d is one or more, and the occurrence order of the respective repeating units in parentheses with the subscript a, b, c or d is not limited in the formula, Rf is each independently at each occurrence an alkyl group having 1-16 carbon atoms which may be substituted by one or more fluorine atoms;

$X^{5'}$ is each independently a single bond or a 2-10 valent organic group;

β is each independently an integer of 1-9;

β' is each independently an integer of 1-9; and $R^{82}$ is a single bond or a divalent organic group, with HSiM$_3$ wherein M is each independently a halogen atom, $R^1$ or $R^2$, $R^1$ is each independently at each occurrence a hydrogen atom or an alkyl group having 1-22 carbon atoms, and $R^2$ is each independently at each occurrence a hydroxyl group or a hydrolyzable group, and as necessary, converting the halogen atom to $R^1$ or $R^2$, as a compound of the formula (B1") or (B2"):

$$(\text{Rf—PFPE})_{\beta'}\text{—X}^{5'}\text{—(R}^{82}\text{—CH}_2\text{CH}_2\text{—SiR}^1{}_n\text{R}^2{}_{3-n})_\beta \quad (B1")$$

$$(\text{R}^1{}_n\text{R}^2{}_{3-n}\text{Si—CH}_2\text{CH}_2\text{—R}^{82})_\beta\text{X}^{5'}\text{—PFPE-X}^{5'}\text{—**} \\ (\text{R}^{82}\text{—CH}_2\text{CH}_2\text{—SiR}^1{}_n\text{R}^2{}_{3-n})_\beta \quad (B2")$$

wherein PFPE, Rf, $X^{5'}$, β, β' and $R^{82}$ are as defined above; and n is an integer of 0-3.

In the formula (B1") or (B2"), the portion from $X^{5'}$ to $R^{82}$—CH$_2$CH$_2$— corresponds to $X^5$ in the formula (B1) or (B2). Therefore, the preferable $X^{5'}$ is a group excluding a portion corresponding to —$R^{82}$—CH$_2$CH$_2$— from the preferable $X^5$ described above.

Formulae (C1) and (C2):

$$(\text{Rf—PFPE})_\gamma\text{—X}^7\text{—(SiR}^a{}_k\text{R}^b{}_l\text{R}^c{}_m)_{\gamma'} \quad (C1)$$

$$(\text{R}^c{}_m\text{R}^b{}_l\text{R}^a{}_k\text{Si})_{\gamma'}\text{—X}^7\text{—PFPE-X}^7\text{—(SiR}^a{}_k\text{R}^b{}_l\text{R}^c{}_m)_{\gamma'} \quad (C2)$$

In the formulae (C1) and (C2), Rf and PFPE are as defined for the formulae (A1) and (A2)

In the formula, $X^7$ is each independently a single bond or a 2-10 valent organic group. $X^7$ is recognized to be a linker which connects between a perfluoropolyether moiety (an Rf—PFPE moiety or —PFPE- moiety) providing mainly water-repellency, surface slip property and the like and a silane moiety (specifically, —SiR$^a{}_k$R$^b{}_l$R$^c{}_m$) providing an ability to bind to a base material in the compound of the formula (C1) and (C2). Therefore, $X^7$ may be any organic group as long as the compound of the formula (C1) and (C2) can stably exist.

In the formula, γ is an integer of 1-9, and γ' is an integer of 1-9. γ and γ' may be determined depending on the valence number of $X^7$, and in the formula (C1), the sum of γ and γ' is the valence number of $X^7$. For example, when $X^7$ is a 10 valent organic group, the sum of γ and γ' is 10, for example, γ is 9 and γ' is 1, γ is 5 and γ' is 5, or γ is 1 and γ' is 9. When $X^7$ is a divalent organic group, γ and γ' are 1. In the formula (C1), γ is a value obtained by subtracting 1 from the valence number of $X^7$.

$X^7$ is preferably a 2-7 valent, more preferably a 2-4 valent, further preferably a divalent organic group.

In one embodiment, $X^7$ is a 2-4 valent organic group, γ is 1-3, and γ' is 1.

In another embodiment, $X^7$ is a divalent organic group, $\gamma$ is 1, and $\gamma'$ is 1. In this case, the formulae (C1) and (C2) are represented by the following formulae (C1') and (C2').

$$Rf\text{—PFPE-}X^7\text{—SiR}^a_k R^b_l R^c_m \qquad (C1')$$

$$R^c_m R^b_l R^a_k Si\text{—}X^7\text{—PFPE-}X^7\text{—SiR}^a_k R^b_l R^c_m \qquad (C2')$$

Examples of $X^7$ include, but are not particularly limited to, for example, the same groups as those described for $X^1$.

Among them, a preferable specific embodiment of $X^7$ includes:
—$CH_2O(CH_2)_2$—,
—$CH_2O(CH_2)_3$—,
—$CH_2O(CH_2)_6$—,
—$CH_2O(CH_2)_3Si(CH_3)_2OSi(CH_2)_2(CH_2)_2$—,
—$CH_2O(CH_2)_3Si(CH_3)_2OSi(CH_3)_2OSi(CH_3)_2(CH_2)_2$—,
—$CH_2O(CH_2)_3Si(CH_2)_2O(Si(CH_3)_2O)_2Si(CH)_2(CH_2)_2$—,
—$CH_2O(CH_2)_3Si(CH_3)_2O(Si(CH_3)_2O)_3Si(CH)_2(CH_2)_2$—,
—$CH_2O(CH_2)_3Si(CH_3)_2O(Si(CH_3)_2O),Si(CH_3)_2(CH_2)_2$—,
—$CH_2O(CH_2)_3Si(CH_3)_2O(Si(CH_3)_2O)_{20}Si(CH_3)_2(CH_2)_2$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2CF_2$—,
—$CH_2OCH_2CF_2CF_2OCF(CF_3) F_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3) CF_2OCF_2CF_2$—,
—$CH_2OCH_2CHFCF_2OCF(CF_3) CF_2OCF_2CF_2CF_2$—
—$CH_2OCH_2(CH_2)_7CH_2Si(OCH_3)_2OSi(OCH)_2(CH_2)_2Si(OCH_3)_2OSi(OCH_3)_2(CH_2)_2$—,
—$CH_2OCH_2CH_2CH_2Si(OCH_3)_2OSi(OCH_3)_2(CH_2)_3$—,
—$CH_2OCH_2CH_2CH_2Si(OCH_2CH_3)_2OSi(OCH_3)_2(CH_3)_2(CH_2)_3$—,
—$CH_2OCH_2CH_2CH_2Si(OCH_3)_2OSi(OCH_3)_2(CH_2)_2$—,
—$CH_2OCH_2CH_2CH_2Si(OCH_2CH_3)_2OSi(OCH_2CH_3)_2(CH_2)_2$—,
—$(CH_2)_2$—,
—$(CH_2)_3$—,
$S(CH_2)_4$—,
—$(CH_2)_6$—,
—$(CH_2)_2$—$Si(CH_3)_2$—$(CH_2)_2$—
—$CONH$—$(CH_2)_3$—,
—$CON(CH_3)$—$(CH_2)_3$—,
—$CON(Ph)\text{-}(CH_2)_3$— (wherein Ph is phenyl),
—$CONH$—$(CH_2)_6$—,
—$CON(CH_3)$—$(CH_2)_6$—,
—$CON(Ph)\text{-}(CH_2)_6$— (wherein Ph is phenyl),
—$CONH$—$(CH_2)_2NH(CH_2)_3$—,
—$CONH$—$(CH_2)_6NH(CH_2)_3$—
—$CH_2O$—$CONH$—$(CH_2)_3$—,
—$CH_2O$—$CONH$—$(CH_2)_6$—,
—$S$—$(CH_2)_3$—,
—$(CH_2)_2S(CH_2)_3$,
—$CONH$—$(CH_2)_3Si(CH_3)_2OSi(CH_3)_2(CH_2)_2$—,
—$CONH$—$(CH_2)_3Si(CH_3)_2OSi(CH_3)_2OSi(CH_3)_2(CH_2)_2$—,
—$CONH$—$(CH_2)_3Si(CH_3)_2O(Si(CH_3)_2O)_2Si(CH_3)_2(CH_2)_2$—,
—$CONH$—$(CH_2)_3Si(CH_3)_2O(Si(CH_3)_2O)_3Si(CH_3)_2(CH_2)_2$,
—$CONH$—$(CH_2)_3Si(CH_3)_2O(Si(CH_3)_2O)\quad Si(CH_3)_2(CH_2)_2$—,
—$CONH$—$(CH_2)_3Si(CH_3)_2O(Si(CH_3)_2O)_2OSi(CH_3)_2(CH_2)_2$—
—$C(O)O$—$(CH_2)_3$—,
—$C(O)O$—$(CH_2)_6$—,
—$CH$—$O$—$(CH_2)_3$—$Si(CH_3)_2$—$(CH_2)_2$—$Si(CH_3)_2(CH_2)_2$—,
—$CH_2$—$O$—$(CH_2)_3$—$Si(CH_3)_2$—$(CH_2)$—$Si(CH_{32}$—$CH(CH_3)_2$—,
—$CH_2$—$O$—$(CH_2)_3$—$Si(CH_3)$—$(CH_2)_2$—$Si(CH_3)_2(CH_2)_3$
—$CH_2$—$O$—$(CH_2)_3$—$Si(CH_3)_2$—$(CH_2)_2$—$Si(CH_3)_2$—$CH(CH_3)$—$CH_2$—,

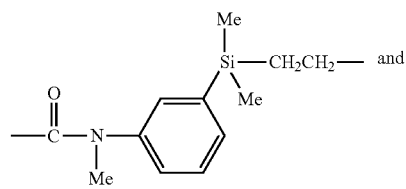 and

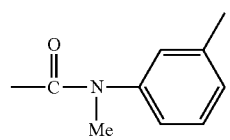

In the formula, $R^a$ is each independently at each occurrence —$Z$—$SiR^{71}_p R^{72}_q R^{73}_r$.

In the formula, Z is each independently at each occurrence an oxygen atom or a divalent organic group.

Z is preferably a divalent organic group, and does not include a group which forms a siloxane bond together with a Si atom (the Si atom binding to $R^a$) present in the end of the molecular backbone of the formula (C1) or the formula (C2).

Z is preferably a $C_{1-6}$ alkylene group, —$(CH_2)_g$—O—$(CH_2)_h$— (wherein g is an integer of 1-6, h is an integer of 1-6) or -phenylene-$(CH_2)_i$— (wherein i is an integer of 0-6), more preferably a $C_{1-3}$ alkylene group. These groups may be substituted with, for example, one or more substituents selected form a fluorine atom, a $C_{1-6}$ alkyl group, a $C_{2-6}$ alkenyl group, and a $C_{2-6}$ alkynyl group.

In the formula, $R^{71}$ is each independently at each occurrence $R^{a'}$, $R^{a'}$ is as defined for $R^a$.

In $R^a$, the number of Si atoms which are linearly connected via Z is up to five. That is, in $R^a$, when there is at least one $R^{71}$, there are two or more Si atoms which are linearly connected via Z in $R^a$. The number of such Si atoms which are linearly connected via Z is five at most. It is noted that "the number of such Si atoms which are linearly connected via Z in $R^a$ is equal to the repeating number of —Z—Si— which are linearly connected in $R^a$.

For example, one example in which Si atoms are connected via Z in $R^a$ is shown below.

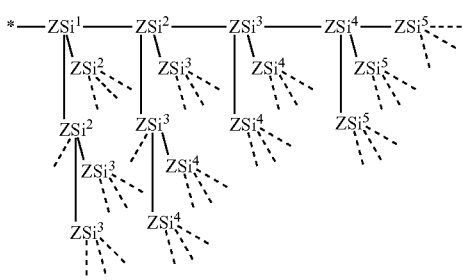

in the above formula, * represents a position binding to Si of the main backbone, and . . . represents that a predetermined group other than ZSi binds thereto, that is, when all three bonds of a Si atom are . . . , it means an end point of the repeat of ZSi. The number on the right shoulder of Si means the number of occurrences of Si which is linearly connected via the Z group from *. In other words, in the chain in which the repeat of ZSi is completed at $Si^2$, "the number of such Si atoms which are linearly connected via the Z group in $R^{a'}$" is 2. Similarly, in the chain in which the repeat of ZSi is completed at $Si^3$, $Si^4$ and $Si^5$, respectively, "the number of such Si atoms which are linearly connected via the Z group in $R^{a'}$" is 3, 4 and 5. It is noted that as seen from the above formula, there are some ZSi chains, but they need not have the same length and may be have arbitrary length.

In a preferred embodiment, as shown below, "the number of such Si atoms which are linearly connected via the Z group in $R^{a'}$" is 1 (left formula) or 2 (right formula) in all chains.

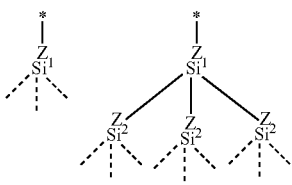

In one embodiment, the number of such Si atoms which are linearly connected via the Z group in $R^a$ is 1 or 2, preferably 1.

In the formula, $R^{72}$ is each independently at each occurrence a hydroxyl group or a hydrolyzable group.

The "hydrolyzable group" as used herein represents a group which is able to undergo a hydrolysis reaction. Examples of the hydrolyzable group include —OR, —OCOR, —O—N=C(R)$_2$, —N(R)$_2$, —NHR, halogen (wherein R is a substituted or non-substituted alkyl group having 1-4 carbon atoms), preferably —OR (an alkoxy group). Examples of R include a non-substituted alkyl group such as a methyl group, an ethyl group, a propyl group, an isopropyl group, a n-butyl group, an isobutyl group; a substituted alkyl group such as a chloromethyl group. Among them, an alkyl group, in particular a non-substituted alkyl group is preferable, a methyl group or an ethyl group is more preferable. The hydroxyl group may be, but is not particularly limited to, a group generated by hydrolysis of a hydrolyzable group.

Preferably, $R^{72}$ is —OR wherein R is a substituted or unsubstituted $C_{1-3}$ alkyl group, more preferably a methyl group.

In the formula, $R^{73}$ is each independently at each occurrence a hydrogen atom or a lower alkyl group. The lower alkyl group is preferably an alkyl group having 1-20 carbon atoms, more preferably an alkyl group having 1-6 carbon atoms, further preferably a methyl group.

In the formula, p is each independently at each occurrence an integer of 0-3; q is each independently at each occurrence an integer of 0-3; and r is each independently at each occurrence an integer of 0-3. The sum of p, q and r is 3.

In a preferable embodiment, in $R^{a'}$ at the end of $R^a$ ($R^a$ when $R^{a'}$ is absent), q is preferably 2 or more, for example, 2 or 3, more preferably 3.

In a preferable embodiment, at least one of the end portions in $R^a$ may be —Si(—Z—SiR$^{72}_q$R$^{73}_r$)$_2$ or —Si(—Z—SiR$^{72}_q$R$^{73}_r$)$_3$, preferably —Si(—Z—SiR$^{72}_q$R$^{73}_r$)$_3$. In the formula, the unit (—Z—SiR$^{72}_q$R$^{73}_r$) is preferably (—Z—SiR$^{72}_3$). In a further preferable embodiment, all end portions in $R^a$ may be —Si(—Z—SiR$^{72}_q$R$^{73}_r$)$_3$, preferably —Si(—Z—SiR$^{72}_3$)$_3$.

In the formulae (C1) and (C2), at least one $R^{72}$ is present.

In the formula, $R^b$ is each independently at each occurrence a hydroxyl group or a hydrolyzable group.

$R^b$ is preferably a hydroxyl group, —OR, —OCOR, —O—N=C(R)$_2$, —N(R)$_2$, —NHR, halogen (wherein R is a substituted or unsubstituted alkyl group having 1-4 carbon atoms), more preferably —OR. R is an unsubstituted alkyl group such as a methyl group, an ethyl group, a propyl group, an isopropyl group, a n-butyl group, an isobutyl group; a substituted alkyl group such as a chloromethyl group. Among them, an alkyl group, in particular unsubstituted alkyl group is preferable, and a methyl group or an ethyl group is more preferable. The hydroxyl group may be, but is not particularly limited to, a group generated by hydrolysis of a hydrolyzable group. More preferably, $R^c$ is —OR wherein R is a substituted or unsubstituted $C_{1-3}$ alkyl group, more preferably a methyl group.

In the formula, $R^c$ is each independently at each occurrence a hydrogen atom or a lower alkyl group. The lower alkyl group is preferably an alkyl group having 1-20 carbon atoms, more preferably an alkyl group having 1-6 carbon atoms, further preferably a methyl group.

In the formula, k is each independently at each occurrence an integer of 0-3; l is each independently at each occurrence an integer of 0-3; m is each independently at each occurrence an integer of 0-3. The sum of k, l and m is 3.

The compound of the formulae (C1) and (C2) can be prepared, for example, by introducing a hydroxyl group in the end of a perfluoropolyether derivative corresponding to the Rf—PFPE moiety as a raw material, followed by further introducing a group having an unsaturated group in the end thereof, and reacting the group having an unsaturated group with a silyl derivative having a halogen atom, further introducing a hydroxyl group in the end of the silyl group, and then reacting the group having an unsaturated group with a silyl derivative. For example, the compound can be prepared as follows.

The preferable compound of the formulae (C1) and (C2) a compound of the following formulae (C1") and (C2"):

$$Rf—PFPE—X^7—SiR^a_3 \qquad (C1')$$

$$R^a_3Si—X^7—PFPE—X^7—SiR^a_3 \qquad (C2')$$

wherein:

PFPE is each independently a group of the formula:

$$—(OC_4F_8)_a—(OC_3F_6)_b—(OC_2F_4)_c—(CF_2)_d—$$

wherein a, b, c and d are each independently an integer of 0-200, the sum of a, b, c and d is 1 or more, and the occurrence order of the respective repeating units in parentheses with the subscript a, b, c or d is not limited in the formula;

Rf is each independently at each occurrence an alkyl group having 1-16 carbon atoms which may be substituted by one or more fluorine atoms;

$X^7$ is —CH$_2$O(CH$_2$)$_2$—, —CH$_2$O(CH$_2$)$_3$— or —CH$_2$O(CH$_2$)$_6$—;

$R^a$ is each independently at each occurrence —Z—SiR$^{71}_p$R$^{72}_q$R$^{73}_r$;

Z is a C$_{1-6}$ alkylene group;

$R^{71}$ is each independently at each occurrence $R^{a'}$;

$R^{a'}$ has the same definition as that of $R^a$;

in $R^a$ the number of Si atoms which are straightly linked via the Z group is up to five;

$R^{72}$ is each independently at each occurrence a hydroxyl group or a hydrolyzable group;

$R^{73}$ is each independently at each occurrence a hydrogen atom or a lower alkyl group;

p is each independently at each occurrence an integer of 0-2;

q is each independently at each occurrence an integer of 1-3, preferably 3;

r is each independently at each occurrence an integer of 0-2; and in one $R^a$, the sum of p, q and r is 3.

In the compound of the formulae (C1) and (C2), for example, the following formulae (C1-4) or (C2-4):

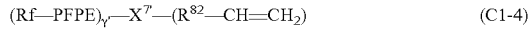
(Rf—PFPE)$_\gamma$—X$^7$—(R$^{82}$—CH=CH$_2$) (C1-4)

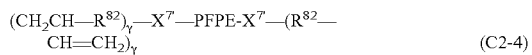
(CH$_2$CH—R$^{82}$)$_\gamma$—X$^7$—PFPE-X$^7$—(R$^{82}$—CH=CH$_2$)$_\gamma$ (C2-4)

wherein:

PFPE is each independently a group of the formula:

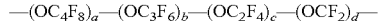
—(OC$_4$F$_8$)$_a$—(OC$_3$F$_6$)$_b$—(OC$_2$F$_4$)$_c$—(OCF$_2$)$_d$— wherein a, b, c and d are each independently an integer of 0-200, the sum of a, b, c and d is 1 or more, and the occurrence order of the respective repeating units in parentheses with the subscript a, b, c or d is not limited in the formula;

Rf is each independently at each occurrence an alkyl group having 1-16 carbon atoms which may be substituted by one or more fluorine atoms;

$X^{7'}$ is each independently a single bond or a 2-10 valent organic group;

γ is each independently an integer of 1-9;

γ' is each independently an integer of 1-9; and $R^{82}$ is a single bond or a divalent organic group, is reacted with a compound of HSiR$^{83}_k$R$^b_l$R$^c_m$ wherein $R^{83}$ is a halogen atom, for example a fluorine atom, a chlorine atom, a bromine atom or an iodine atom, preferably a chlorine atom, $R^b$ is each independently at each occurrence a hydroxyl group or a hydrolyzable group, $R^c$ is each independently at each occurrence a hydrogen atom or a lower alkyl group, k is an integer of 1-3, l and m are each independently an integer of 0-2, and the sum of k, l and m is 3, to obtain a compound of the formula (C1-5) or (C2-5):

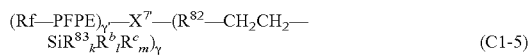
(Rf—PFPE)$_\gamma$—X$^{7'}$—(R$^{82}$—CH$_2$CH$_2$—SiR$^{83}_k$R$^b_l$R$^c_m$)$_\gamma$ (C1-5)

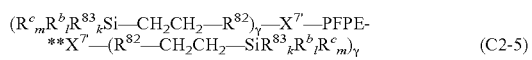
(R$^c_m$R$^b_l$R$^{83}_k$Si—CH$_2$CH$_2$—R$^{82}$)$_\gamma$—X$^{7'}$—PFPE-**X$^{7'}$—(R$^{82}$—CH$_2$CH$_2$—SiR$^{83}_k$R$^b_l$R$^c_m$)$_\gamma$ (C2-5)

wherein Rf, PFPE, $R^{82}$, $R^{83}$, $R^b$, $R^c$, γ, γ', $X^{7'}$, k, l and m are as defined above.

The compound of the formula (C1-5) or (C2-5) obtained is reacted with a compound of Hal-J-R$^{84}$—CH=CH$_2$ wherein Hal is a halogen atom (for example, I, Br, Cl, F, or the like), J is Mg, Cu, Pd or Zn, and $R^{84}$ is a single bond or a divalent organic group, to obtain a compound of the formula (C1-6) or (C2-6):

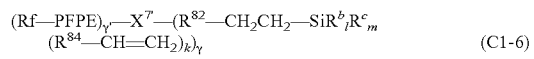
(Rf—PFPE)$_\gamma$—X$^{7'}$—(R$^{82}$—CH$_2$CH$_2$—SiR$^b_l$R$^c_m$(R$^{84}$—CH=CH$_2$)$_k$)$_\gamma$ (C1-6)

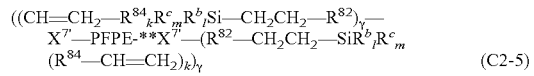
((CH=CH$_2$—R$^{84}_k$R$^c_m$R$^b_l$Si—CH$_2$CH$_2$—R$^{82}$)$_\gamma$—X$^{7'}$—PFPE-**X$^{7'}$—(R$^{82}$—CH$_2$CH$_2$—SiR$^b_l$R$^c_m$(R$^{84}$—CH=CH$_2$)$_k$)$_\gamma$ (C2-5)

wherein Rf, PFPE, $R^{82}$, $R^{84}$, $R^b$, $R^c$, γ, γ', $X^{7'}$, k, l and m are as defined above.

The compound of the formula (C1-6) or (C2-6) obtained can be reacted with HSiM$_3$ (wherein M is each independently a halogen atom, $R^{72}$ or $R^{73}$, $R^{72}$ is each independently at each occurrence a hydroxyl group or a hydrolyzable group, and $R^{73}$ is each independently at each occurrence a hydrogen atom or a lower alkyl group), and as necessary, converting the halogen atom the halogen atom to $R^{72}$ or $R^{73}$ to obtain a compound of the formula (C1''') or (C2'''):

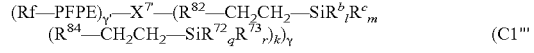
(Rf—PFPE)$_\gamma$—X$^{7'}$—(R$^{82}$—CH$_2$CH$_2$—SiR$^b_l$R$^c_m$(R$^{84}$—CH$_2$CH$_2$—SiR$^{72}_q$R$^{73}_r$)$_k$)$_\gamma$ (C1''')

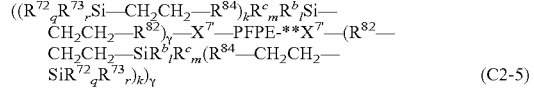
((R$^{72}_q$R$^{73}_r$Si—CH$_2$CH$_2$—R$^{84}$)$_k$R$^c_m$R$^b_l$Si—CH$_2$CH$_2$—R$^{82}$)$_\gamma$—X$^{7'}$—PFPE-**X$^{7'}$—(R$^{82}$—CH$_2$CH$_2$—SiR$^b_l$R$^c_m$(R$^{84}$—CH$_2$CH$_2$—SiR$^{72}_q$R$^{73}_r$)$_k$)$_\gamma$ (C2-5)

wherein

Rf, PFPE, $R^{72}$, $R^{73}$, $R^{82}$, $R^{84}$, $R^b$, $R^c$, γ, γ', $X^{7'}$, k, l and m are as defined above;

q is each independently at each occurrence an integer of 1-3; and r is each independently at each occurrence an integer of 0-2.

In the formula (C1''') or (C2'''), a portion from $X^{7'}$ to $R^{82}$—CH$_2$CH$_2$— corresponds to $X^7$ in the formula (C1) or (C2), and —R$^{84}$—CH$_2$CH$_2$— corresponds to Z in the formula (C1) or (C2).

In the surface-treating agent of the present invention, a proportion of the perfluoro(poly)ether group containing silane compound having a molecular weight of 3,000 or less in the perfluoro(poly)ether group containing silane compounds of the above formula (A1), (A2), (B1), (B2), (C1) or (C2) is 9 mol % or less, preferably 7 mol % or less, further preferably 5 mol % or less. By setting the proportion of the perfluoro(poly)ether group containing silane compound having a molecular weight of 3,000 or less to 9 mol % or less, the surface-treating layer having more excellent friction durability can be formed. It is noted that the proportion is a proportion of the perfluoro(poly)ether group containing silane compound having a molecular weight of 3,000 or less with respect to the total amount of the perfluoro(poly)ether group containing silane compounds of the above general formulae contained in the surface-treating agent of the present invention.

A method of adjusting the proportion of the perfluoro(poly)ether group containing silane compound having a molecular weight of 3,000 or less with respect to the whole of the perfluoro(poly)ether group containing silane compounds contained in the surface-treating agent to 9 mol % or less is not particularly limited, and includes, for example, a method that the compounds having low molecular weight is removed by distillation, etc. The distillation is preferably a molecular distillation. The distillation may be performed for the perfluoro(poly)ether group containing silane compound, or a raw material, for example, an acid fluoride having a perfluoropolyether group. The condition of the distillation can be selected depending on a compound to be distilled by those skilled in the art.

The proportion of the perfluoro (poly)ether group containing silane compound having a molecular weight of 3,000 or less with respect to the whole of the perfluoro(poly)ether group containing silane compounds contained in the surface-treating agent can be measured by GPC (Gel Permeation Chromatography) analysis. The GPC measurement can be performed for example by using GPCmax provided with TDA-302(HPLC system: manufactured by Malvern Instruments) as a detector.

The number average molecular weight of the perfluoro (poly)ether group containing silane compound contained in the surface-treating agent of the present invention is preferably 5,000 or more, more preferably 6,000 or more, preferably 100,000 or less, more preferably 30,000 or less, further preferably 10,000 or less.

The number average molecular weight of the PFPE portion of the perfluoro(poly)ether group containing silane compound contained in the surface-treating agent of the present invention may be, not particularly limited to, preferably 4,000-30,000, more preferably 5,000-10,000.

In the present invention, the "number average molecular weight" is measured by GPC (Gel Permeation Chromatography) analysis.

The surface-treating agent of the present invention can provide a base material with water-repellency, oil-repellency, antifouling property, waterproof property and high friction durability, and can be suitably used as an antifouling-coating agent or a water-proof coating agent, although the present invention is not particularly limited thereto.

The surface treating agent may be diluted with a solvent. Examples of the solvent include, but are not particularly limited to, for example, a solvent selected from the group consisting of perfluorohexane, $CF_3CF_2CHCl_2$, $CF_3CH_2CF_2CH_3$, $CF_3CHFCHFC_2F_5$, 1,1,1,2,2,3,3,4,4,5,5,6,6-tridecafluorooctane, 1,1,2,2,3,3,4-heptafluorocyclopentane (ZEORORA H (trade name), etc.), $C_4F_9OCH_3$, $C_4F_9OC_2H_5$, $CF_3CH_2OCF_2CHF_2$, $C_6F_{13}CH=CH_2$, xylene hexafluoride, perfluorobenzene, methyl pentadecafluoroheptyl ketone, trifluoroethanol, pentafluoropropanol, hexafluoroisopropanol, $HCF_2CF_2CH_2OH$, methyl trifluoromethanesulfonate, trifluoroacetic acid and $CF_3O(CF_2CF_2O)_m(CF_2O)_nCF_2CF_3$ [wherein m and n are each independently an integer of 0 or more and 1000 or less, the occurrence order of the respective repeating units in parentheses with the subscript m or n is not limited in the formula, with the proviso that the sum of m and n is 1 or more.], 1,1-dichloro-2,3,3,3-tetrafluoro-1l-propene, 1,2-dichloro-1,3,3,3-tetrafluoro-1-propene, 1,2-dichloro-3,3,3-trichloro-1-propene, 1,1-dichloro-3,3,3-trichloro-1-propene, 1,1,2-trichloro-3,3,3-trichloro-1-propene, 1,1,1,4,4,4-hexafluoro-2-butene. These solvents may be used alone or as a mixture of 2 or more compound.

The surface treating agent may comprise other components in addition to the perfluoro(poly)ether group containing silane compound. Examples of the other components include, but are not particularly limited to, for example, a (non-reactive) fluoropolyether compound which may be also understood as a fluorine-containing oil, preferably a perfluoro(poly)ether compound (hereinafter, referred to as "the fluorine-containing oil"), a (non-reactive) silicone compound which may be also understood as a silicone oil (hereinafter referred to as "a silicone oil"), a catalyst, and the like.

Examples of the above-mentioned fluorine-containing oil include, but are not particularly limited to, for example, a compound of the following general formula (3) (a perfluoro (poly)ether compound).

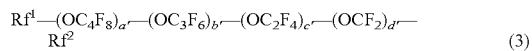

(3)

In the formula, $Rf^1$ is a $C_{1-16}$ alkyl group which may be substituted by one or more fluorine atoms (preferably, a $C_{1-16}$ perfluoroalkyl group), $Rf^2$ is a $C_{1-16}$ alkyl group which may be substituted by one or more fluorine atoms (preferably, a $C_{1-16}$ perfluoroalkyl group), a fluorine atom or a hydrogen atom, and more preferably, Rf and $Rf^2$ is each independently a $C_1$-3 perfluoroalkyl group.

Subscripts a', b', c' and d' are the repeating number of each of four repeating units of perfluoropolyether which constitute a main backbone of the polymer, and are each independently an integer of 0 or more and 300 or less, and the sum of a', b', c' and d' is at least 1, preferably 1-300, more preferably 20-300. The occurrence order of the respective repeating units in parentheses with the subscript a', b', c' or d' is not limited in the formulae. Among these repeating units, the —(OC$_4$F$_8$)— group may be any of —(OCF$_2$CF$_2$CF$_2$CF$_2$)—, —(OCF(CF$_3$) CF$_2$CF$_2$)—, —(OCF$_2$CF(CF$_3$) CF$_2$)—, —(OCF$_2$CF$_2$CF(CF$_3$))—, —(OC(CF$_3$)$_2$CF$_2$)—, —(OCF$_2$C(CF$_3$)$_2$)—, —(OCF(CF$_3$)CF(CF$_3$))—, —(OCF(C$_2$F$_5$) CF$_2$)— and —(OCF$_2$CF(C$_2$F$_5$))—, preferably —(OCF$_2$CF$_2$CF$_2$CF$_2$). The —(OC$_3$F$_6$)— group may be any of —(OCF$_2$CF$_2$CF$_2$)—, —(OCF(CF$_3$) CF$_2$)— and —(OCF$_2$CF(CF$_3$))—, preferably —(OCF$_2$CF$_2$CF$_2$)—. The —(OC$_2$F$_4$)— group may be any of —(OCF$_2$CF$_2$)— and —(OCF(CF$_3$))—, preferably —(OCF$_2$CF$_2$)—.

Examples of the perfluoropolyether compound of the above general formula (3) include a compound of any of the following general formulae (3a) and (3b) (may be one compound or a mixture of two or more compounds).

(3a)

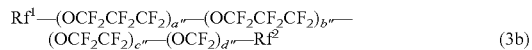

(3b)

In these formulae:

$Rf^1$ and $Rf^2$ are as defined above; in the formula (3a), b''' is an integer of 1 or more and 100 or less; and in the formula (3b), a'' and b'' are each independently an integer of 0 or more and 30 or less, for example 1 or more and 30 or less, and c'' and d'' are each independently an integer of 1 or more and 300 or less. The occurrence order of the respective repeating units in parentheses with the subscript a'', b'', c'' or d'' is not limited in the formulae.

The above-mentioned fluorine-containing oil may have an average molecular weight of 1,000-30,000. By having such average molecular weight, high surface slip property can be obtained.

The fluorine-containing oil may be contained in the surface-treating agent of the present invention, for example, at 0-500 parts by mass, preferably 0-400 parts by mass, more preferably 5-300 parts by mass with respect to 100 parts by mass of the perfluoro(poly)ether group containing silane compound (as the total mass when two or more compounds are used; hereinafter the same shall apply).

The compound of the general formula (3a) and the compound of the general formula (3b) may be used alone or in combination. The compound of the general formula (3b) is preferable than the compound of the general formula (3a) since the compound of the general formula (3b) provides higher surface slip property than the compound of the general formula (3a). When they are used in combination, the ratio by mass of the compound of the general formula (3a) to the compound of the general formula (3b) is preferably 1:1 to 1:30, more preferably 1:1 to 1:10. By applying such ratio by mass, a perfluoropolyether group-containing silane-based coating which provides a good balance of surface slip property and friction durability can be obtained.

In one embodiment, the fluorine-containing oil comprises one or more compounds of the general formula (3b) In such embodiment, the mass ratio of the perfluoro(poly)ether group containing silane compound to the compound of the formula (3b) in the surface-treating agent is preferably 10:1 to 1:10, more preferably 4:1 to 1:4.

In one embodiment, a number average molecular weight of the compound of the formula (3a) is preferably 2,000-8,000.

In one embodiment, a number average molecular weight of the compound of the formula (3b) is preferably 8,000-30,000.

In another embodiment, a number average molecular weight of the compound of the formula (3b) is preferably 3,000-8,000.

In a preferable embodiment, when a surface-treating layer is formed by using vacuum deposition, a number average molecular weight of the fluorine-containing oil may be higher than a number average molecular weight of the perfluoro(poly)ether group containing silane compound. By selecting such number average molecular weights, more excellent surface slip property and friction durability can be obtained.

From the other point of view, the fluorine-containing oil may be a compound of the general formula $Rf^3$—F wherein $Rf^3$ is a $C_{5-16}$ perfluoroalkyl group. In addition, the fluorine-containing oil may be a chlorotrifluoroethylene oligomer. The compound of $Rf^3$—F or the chlorotrifluoroethylene oligomer is preferable because the compounds have high affinity for the fluorine-containing compound having a carbon-carbon unsaturated bond at the molecular terminal wherein a terminal is a $C_{1-16}$ perfluoroalkyl group.

The fluorine-containing oil contributes to increasing of surface slip property of the surface-treating layer.

Examples of the above-mentioned silicone oil include, for example, a liner or cyclic silicone oil having 2,000 or less siloxane bonds. The liner silicone oil may be so-called a straight silicone oil and a modified silicon oil. Examples of the straight silicone oil include dimethylsilicone oil, methylphenylsilicone oil, and methylhydrogensilicone oil. Examples of the modified silicone oil include that which is obtained by modifying a straight silicone oil with alkyl, aralkyl, polyether, higher fatty acid ester, fluoroalkyl, amino, epoxy, carboxyl, alcohol, or the like. Examples of the cyclic silicone oil include, for example, cyclic dimethylsiloxane oil.

The silicone oil may be contained in the surface-treating agent of the present invention, for example, at 0-300 parts by mass, preferably 0-200 parts by mass with respect to 100 parts by mass of the fluorine-containing compound having a carbon-carbon unsaturated bond at the molecular terminal (as the total mass when two or more compounds are used; hereinafter the same shall apply).

The silicone oil contributes to increasing of surface slip property of the surface-treating layer.

Examples of the above-mentioned catalyst include an acid (for example, acetic acid, trifluoroacetic acid, etc.), a base (for example, ammonia, triethylamine, diethylamine, etc.), a transition metal (for example, Ti, Ni, Sn, etc.), and the like.

The catalyst facilitates hydrolysis and dehydration-condensation of the perfluoro(poly)ether group containing silane compound to facilitate a formation of the surface-treating layer.

The surface-treating agent of the present invention is impregnated into a porous material, for example, a porous ceramic material, a metal fiber for example that obtained by solidifying a steel wool to obtain a pellet. The pellet can be used, for example, in vacuum deposition.

Next, the article of the present invention will be described.

The article of the present invention comprises a base material and a layer (surface-treating layer) which is formed from the surface-treating agent of the present invention on the surface of the base material. This article can be produced, for example, as follows.

Firstly, the base material is provided. The base material usable in the present invention may be composed of any suitable material such as a glass, a sapphire glass, a resin (may be a natural or synthetic resin such as a common plastic material, and may be in form of a plate, a film, or others), a metal (may be a simple substance of a metal such as aluminum, copper, or iron, or a complex such as alloy or the like), a ceramic, a semiconductor (silicon, germanium, or the like), a fiber (a fabric, a non-woven fabric, or the like), a fur, a leather, a wood, a pottery, a stone, an architectural member or the like. The base material is preferably a glass or a sapphire glass.

As the glass, a soda-lime glass, an alkali aluminosilicate glass, a borosilicate glass, a non-alkaline glass, a crystal glass, a quartz glass is preferable, a chemically strengthened soda-lime glass, a chemically strengthened alkali aluminosilicate glass, and a chemically strengthened borosilicate glass are more preferable.

As the resin, an acrylic resin or a polycarbonate resin are preferable.

For example, when an article to be produced is an optical member, a material constituting the surface of the base material may be a material for an optical member, for example, a glass or a transparent plastic. For example, when an article to be produced is an optical member, any layer (or film) such as a hard coating layer or an antireflection layer may be formed on the surface (outermost layer) of the base material. As the antireflection layer, either a single antireflection layer or a multi antireflection layer may be used. Examples of an inorganic material usable in the antireflection layer include $SiO_2$, $SiO$, $ZrO_2$, $TiO_2$, $TiO$, $Ti_2O_3$, $Ti_2O_5$, $Al_2O_3$, $Ta_2O_5$, $CeO_2$, $MgO$, $Y_2O_3$, $SnO_2$, $MgF_2$, $WO_3$, and the like. These inorganic materials may be used alone or in combination with two or more (for example, as a mixture). When multi antireflection layer is formed, preferably, $SiO_2$ and/or $SiO$ are used in the outermost layer. When an article to be produced is an optical glass part for a touch panel, it may have a transparent electrode, for example, a thin layer comprising indium tin oxide (ITO), indium zinc oxide, or the like on a part of the surface of the base material (glass). Furthermore, the base material may have an insulating layer, an adhesive layer, a protecting layer, a decorated frame layer (I-CON), an atomizing layer, a hard coating layer, a polarizing film, a phase difference film, a liquid crystal display module, and the like, depending on its specific specification.

The shape of the base material is not specifically limited. The region of the surface of the base material on which the surface-treating layer should be formed may be at least a part of the surface of the base material, and may be appropriately determined depending on use, the specific specification, and the like of the article to be produced.

The base material may be that of which at least the surface consists of a material originally having a hydroxyl group. Examples of such material include a glass, in addition, a metal on which a natural oxidized film or a thermal oxidized film is formed (in particular, a base metal), a ceramic, a semiconductor, and the like. Alternatively, as in a resin, when the hydroxyl groups are present but not sufficient, or when the hydroxyl group is originally absent, the hydroxyl group can be introduced on the surface of the base material, or the number of the hydroxyl group can be increased by subjecting the base material to any pretreatment. Examples of the pretreatment include a plasma treatment (for example, corona discharge) or an ion beam irradiation. The plasma treatment may be suitably used to introduce the hydroxyl group into or increase it on the surface of the base material, further, to clarify the surface of the base material (remove foreign materials, and the like). Alternatively, other examples of the pretreatment include a method wherein a monolayer of a surface adsorbent having a carbon-carbon unsaturated bond group is formed on the surface of the base material by using a LB method (Langmuir-Blodgett method) or a chemical adsorption method beforehand, and then, cleaving the unsaturated bond under an atmosphere of oxygen and nitrogen.

Alternatively, the base material may be that of which at least the surface consists of a material comprising other reactive group such as a silicon compound having one or more Si—H groups or alkoxysilane.

Next, the film of the above surface-treating agent of the present invention is formed on the surface of the base material, and the film is post-treated, as necessary, and thereby the surface-treating layer is formed from the surface-treating agent.

The formation of the film of the surface-treating agent of the present invention can be performed by applying the above surface-treating agent on the surface of the base material such that the surface-treating agent coats the surface. The method of coating is not specifically limited. For example, a wet coating method or a dry coating method can be used.

Examples of the wet coating method include dip coating, spin coating, flow coating, spray coating, roll coating, gravure coating, and a similar method.

Examples of the dry coating method include deposition (usually, vacuum deposition), sputtering, CVD and a similar method. The specific examples of the deposition method (usually, vacuum deposition) include resistance heating, electron beam, high-frequency heating using microwave, etc., ion beam, and a similar method. The specific examples of the CVD method include plasma-CVD, optical CVD, thermal CVD and a similar method. The deposition method is will be described below in more detail.

Additionally, coating can be performed by an atmospheric pressure plasma method.

When the wet coating method is used, the surface-treating agent of the present invention is diluted with a solvent, and then it is applied to the surface of the base material. In view of stability of the surface-treating agent of the present invention and volatile property of the solvent, the following solvents are preferably used: a $C_{5-12}$ aliphatic perfluorohydrocarbon (for example, perfluorohexane, perfluoromethylcyclohexane and perfluoro-1,3-dimethylcyclohexane); an aromatic polyfluorohydrocarbon (for example, bis(trifluoromethyl)benzene); an aliphatic polyfluorohydrocarbon (for example, $C_6F_{13}CH_2CH_3$ (for example, ASAHIKLIN (registered trademark) AC-6000 manufactured by Asahi Glass Co., Ltd.), 1,1,2,2,3,3,4-heptafluorocyclopentane (for example, ZEORORA (registered trademark) H manufactured by Nippon Zeon Co., Ltd.); hydrofluorocarbon (HFC) (for example, 1,1,1,3,3-pentafluorobutane (HFC-365mfc)); hydrochlorofluorocarbon (for example, HCFC-225 (ASAHIKLIN (registered trademark) AK225)); a hydrofluoroether (HFE) (for example, an alkyl perfluoroalkyl ether such as perfluoropropyl methyl ether ($C_3F_7OCH_3$) (for example, Novec (trademark) 7000 manufactured by Sumitomo 3M Ltd.), perfluorobutyl methyl ether ($C_4F_9OCH_3$) (for example, Novec (trademark) 7100 manufactured by Sumitomo 3M Ltd.), perfluorobutyl ethyl ether ($C_4F_9OC_2H_5$) (for example, Novec (trademark) 7200 manufactured by Sumitomo 3M Ltd.), and perfluorohexyl methyl ether ($C_2F_5CF(OCH_3)C_3F_7$) (for example, Novec (trademark) 7300 manufactured by Sumitomo 3M Ltd.) (the perfluoroalkyl group and the alkyl group may be liner or branched)), or $CF_3CH_2OCF_2CHF_2$ (for example, ASAHIKLIN (registered trademark) AE-3000 manufactured by Asahi Glass Co., Ltd.), 1,2-dichloro-1,3,3,3-tetrafluoro-1-propene (for example, VERTREL (registered trademark) Sion manufactured by Du Pont-Mitsui Fluorochemicals Co., Ltd.) and the like. These solvents may be used alone or as a mixture of 2 or more compound. Among them, the hydrofluoroether is preferable, perfluorobutyl methyl ether ($C_4F_9OCH_3$) and/or perfluorobutyl ethyl ether ($C_4F_9OC_2H_5$) are particularly preferable. Furthermore, the solvent can be mixed with another solvent, for example, to adjust solubility of the perfluoro(poly)ether group containing silane compound.

When the dry coating method is used, the surface-treating agent of the present invention may be directly subjected to the dry coating method, or may be diluted with a solvent, and then subjected to the dry coating method.

The formation of the film is preferably performed so that the surface-treating agent of the present invention is present together with a catalyst for hydrolysis and dehydration-condensation in the coating. Simply, when the wet coating method is used, after the surface-treating agent of the present invention is diluted with a solvent, and just prior to applying it to the surface of the base material, the catalyst may be added to the diluted solution of the surface-treating agent of the present invention. When the dry coating method is used, the surface-treating agent of the present invention to which a catalyst has been added is used itself in deposition (usually, vacuum deposition), or pellets may be used in the deposition (usually, the vacuum deposition), wherein the pellets is obtained by impregnating a porous metal such as iron or copper with the surface-treating agent of the present invention to which the catalyst has been added.

As the catalyst, any suitable acid or base can be used. As the acid catalyst, for example, acetic acid, formic acid, trifluoroacetic acid, or the like can be used. As the base catalyst, for example, ammonia, an organic amine, or the like can be used.

Next, the film is post-treated as necessary. This post-treatment is, but not limited to, a treatment in which water supplying and dry heating are sequentially performed, in more particular, may be performed as follows.

After the film of the surface-treating agent of the present invention is formed on the surface of the base material as mentioned above, water is supplied to this film (hereinafter, referred to as precursor coating). The method of supplying water may be, for example, a method using dew condensation due to the temperature difference between the precursor coating (and the base material) and ambient atmosphere or spraying of water vapor (steam), but not specifically limited thereto.

It is considered that, when water is supplied to the precursor coating, water acts on a hydrolyzable group bonding to Si present in the perfluoro(poly)ether group containing silane compound in the surface-treating agent of the present invention, thereby enabling rapid hydrolysis of the compound.

The supplying of water may be performed under an atmosphere, for example, at a temperature of 0-250° C., preferably 60° C. or more, more preferably 100° C. or more and preferably 180° C. or less, more preferably 150° C. By supplying water at such temperature range, hydrolysis can proceed. The pressure at this time is not specifically limited but simply may be ambient pressure.

Then, the precursor coating is heated on the surface of the base material under a dry atmosphere over 60° C. The method of dry heating may be to place the precursor coating together with the base material in an atmosphere at a temperature over 60° C., preferably over 100° C., and for example, of 250° C. or less, preferably of 180° C. or less, and at unsaturated water vapor pressure, but not specifically limited thereto. The pressure at this time is not specifically limited but simply may be ambient pressure.

Under such atmosphere, between the PFPE containing silane compound of the present inventions, the groups bonding to Si after hydrolysis are rapidly dehydration-condensed with each other. Furthermore, between the compound and the base material, the group bonding to Si in the compound after hydrolysis and a reactive group present on the surface of the base material are rapidly reacted, and when the reactive group present on the surface of the base material is a hydroxyl group, dehydration-condensation is caused. As the result, the bond between the perfluoro(poly)ether group containing silane compound and the base material is formed.

The above supplying of water and dry heating may be sequentially performed by using a superheated water vapor.

The superheated water vapor is a gas which is obtained by heating a saturated water vapor to a temperature over the boiling point, wherein the gas, under an ambient pressure, has become to have a unsaturated water vapor pressure by heating to a temperature over 100° C., generally of 500° C. or less, for example, of 300° C. or less, and over the boiling point. In the present invention, in view of suppressing decomposition of the perfluoro(poly)ether group containing silane compound, the superheated water vapor of preferably 250° C. or less, preferably 180° C. or less is used in the supplying of water and dry heating. When the base material on which the precursor coating is formed is exposed to a superheated water vapor, firstly, due to the temperature difference between the superheated water vapor and the precursor coating of a relatively low temperature, dew condensation is generated on the surface of the precursor coating, thereby supplying water to the precursor coating. Presently, as the temperature difference between the superheated water vapor and the precursor coating decreases, water on the surface of the precursor coating is evaporated under the dry atmosphere of the superheated water vapor, and an amount of water on the surface of the precursor coating gradually decreases. During the amount of water on the surface of the precursor coating is decreasing, that is, during the precursor coating is under the dry atmosphere, the precursor coating on the surface of the base material contacts with the superheated water vapor, as a result, the precursor coating is heated to the temperature of the superheated water vapor (temperature over 100° C. under ambient pressure). Therefore, by using a superheated water vapor, supplying of water and dry heating are enabled to be sequentially carried out simply by exposing the base material on which the precursor coating is formed to a superheated water vapor.

As mentioned above, the post-treatment can be performed. It is noted that though the post-treatment may be performed in order to further increase friction durability, it is not essential in the producing of the article of the present invention. For example, after applying the surface-treating agent to the surface of the base material, it may be enough to only stand the base material.

As described above, the surface-treating layer derived from the film of the surface-treating agent of the present invention is formed on the surface of the base material to produce the article of the present invention. The surface-treating layer thus formed has high friction durability. Furthermore, this surface-treating layer may have water-repellency, oil-repellency, antifouling property (for example, preventing from adhering a fouling such as fingerprints), waterproof property (preventing the ingress of water into an electrical member, and the like), surface slip property (or lubricity, for example, wiping property of a fouling such as fingerprints and excellent tactile feeling in a finger) depending on a composition of the surface-treating agent used, in addition to high friction durability, thus may be suitably used as a functional thin film.

The article having the surface-treating layer obtained according to the present invention is not specifically limited to, but may be an optical member. Examples of the optical member include the followings: displays such as a cathode ray tube (CRT; for example, TV, personal computer monitor), a liquid crystal display, a plasma display, an organic EL display, an inorganic thin-film EL dot matrix display, a rear projection display, a vacuum fluorescent display (VFD), a field emission display (FED; Field Emission Display), or a front surface protective plate, an antireflection plate, a polarizing plate, or an anti-glare plate of these display, or these whose surface is subjected to antireflection treatment; lens of glasses, or the like; a touch panel sheet of an instrument such as a mobile phone or a personal digital assistance; a disk surface of an optical disk such as a Blu-ray disk, a DVD disk, a CD-R or MO; an optical fiber, and the like; a display surface of a clock.

Other article having the surface-treating layer obtained according to the present invention may be also a ceramic product, a painted surface, a cloth product, a leather product, a medical product and a plaster.

The article having the surface-treating layer obtained according to the present invention may be also a medical equipment or a medical material The thickness of the surface-treating layer is not specifically limited. For the optical member, the thickness of the surface-treating layer is within the range of 1-50 nm, preferably 1-30 nm, more preferably 1-15 nm, in view of optical performance, surface slip property, friction durability and antifouling property.

Hereinbefore, the article produced by using the surface-treating agent of the present invention is described in detail. It is noted that an application, a method for using or a method for producing the article are not limited to the above exemplification.

EXAMPLES

The surface-treating agent of the present invention will be described in detail through Examples, although the present invention is not limited to Examples. It is noted that in Examples, all chemical formulae described below mean an average composition.

The perfluoro(poly)ether group containing silane compounds listed in Table 1 were used. The proportion of the compound having a molecular weight of 3,000 or less was determined based on a GPC (Gel Permeation Chromatography) measurement. The measurement condition is described below.

(GPC Measurement)

The measurement was conducted by using the system in which the columns below [manufactured by SHOWA DENKO K.K.] were connected in series in this order. It is noted that the molecular weight was calibrated by using perfluoropolyether oil A, B, C.

Samples for Calibration

Perfluoropolyether oil A: Number average molecular weight 7250 Mw/Mn 1.08

Perfluoropolyether oil B: Number average molecular weight 4180 Mw/Mn 1.08

Perfluoropolyether oil C: Number average molecular weight 2725 Mw/Mn 1.08

Column
GPC KF-G (4.6 mmI.D.×1 cm)
GPC KF806L (8.0 mmI.D.×30 cm)
GPC KF806L (8.0 mmI.D.×30 cm)

Apparatus
GPCmax (HPLC system) and, TDA-302 (detector) manufactured by Malvern Instruments Eluate
ASAHIKLIN AK225 (HCFC-225)/1,1,1,3,3,3-hexafluoro-2-propanol [90/10 (w/w)]

Concentration of Sample
20 mg/mL

TABLE 1

| | Chemical formula* | m** (average) | Mn** Number average molecular weight | Mw** Weight average molecular weight | Proportion of compound having a molecular weight of 3,000 or less (mol %) |
|---|---|---|---|---|---|
| Compound 1 | Chemical formula A | 35 | 5690 | 6030 | 0.5 |
| Compound 2 | Chemical formula B | 32 | 5600 | 6710 | 1.9 |
| Compound 3 | Chemical formula A | 48 | 8240 | 10300 | 0.1 |
| Compound 4 | Chemical formula A | 22 | 3920 | 4160 | 9.6 |
| Compound 5 | Chemical formula B | 21 | 3980 | 4450 | 13.8 |
| Compound 6 | Chemical formula A | 12 | 2570 | 2640 | 81.7 |

*Chemical formula A and B are as follows.
Chemical formula A

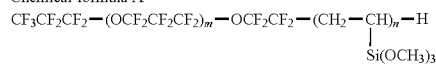

n = 1-6

Chemical formula B

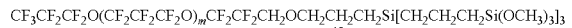

**The value of m means a value measured by $^{19}$F-NMR, Mn and Mw mean a value measured by GPC.

The compound listed in the following table was dissolved in hydrofluoroether (Novec HFE7200 manufactured by Sumitomo 3M Ltd.)) such that the concentration was 20 wt % to prepare Surface-treating agent. Surface-treating agent prepared in the above was vacuum deposited on a chemical strengthening glass (Gorilla glass manufactured by Corning Incorporated; thickness: 0.7 mm). Processing condition of the vacuum deposition was a pressure of $3.0 \times 10^{-3}$ Pa. Firstly, silicon dioxide was deposited on the surface of this chemical strengthening glass in a manner of an electron-beam deposition. Subsequently, the surface-treating agent of 2 mg (that is, it contained of 0.4 mg of the perfluoro(poly)ether group containing silane compound) was vacuum-deposited per one plate of the chemical strengthening glass (55 mm×100 mm). Then, the chemical strengthening glass having the deposited layer was stood under a temperature of 20° C. and a humidity of 65% for 24 hours.

TABLE 2

| | Compound used | Amount of deposition |
|---|---|---|
| Example 1 | Compound 1 | 0.4 mg |
| Example 2 | Compound 2 | 0.4 mg |
| Example 3 | 1:1 Mixture of Compound 3 and Compound 4 (Proportion of the compound having a molecular weight of 3000 or less is 4.5 mol %) Mn: 5620, Mw: 6860 | 0.2 mg per each total 0.4 mg |
| Example 4 | 1:1 Mixture of Compound 1 and Compound 6 (Proportion of the compound having a molecular weight of 3000 or less is 6.7 mol %) Mn: 5580, Mw: 5900 | compound 1: 0.37 mg Compound 6: 0.03 mg Total 0.4 mg |
| Comparative example 1 | Compound 4 | 0.4 mg |
| Comparative example 2 | Compound 5 | 0.4 mg |
| Comparative example 3 | Compound 6 | 0.4 mg |
| Comparative example 4 | 5:1 mixture of Compound 1 and Compound 6 (Proportion of the compound having a molecular weight of 3000 or less is 12.8 mol %) Mn: 5380, Mw: 5790 | Compound 1: 0.33 mg Compound 6: 0.07 mg Total 0.4 mg |

Evaluation

Evaluation of Friction Durability

A static water contact angle of the surface-treating layers formed on the surface of the base material in the above Examples 1-4 and Comparative Examples 1-4 respectively was measured. The static water contact angle was measured for 1 μL of water by using a contact angle measuring instrument (manufactured by KYOWA INTERFACE SCIENCE Co., Ltd.).

Firstly, as an initial evaluation, the static water contact angle of the surface-treating layer of which the surface had not still contacted with anything after formation thereof was measured (the number of rubbing is zero).

As an evaluation of the friction durability, a steel wool friction durability evaluation was performed. Specifically, the base material on which the surface-treating layer was formed was horizontally arranged, and then, a steel wool (grade No. #0000; dimension: 5 mm×10 mm×10 mm) was contacted with the exposed surface of the surface-treating layer and a load of 1000 gf was applied thereon. Then, the steel wool was shuttled at a rate of 140 mm/second while applying the load. The static water contact angle (degree) was measured per a predetermined shuttling number. The evaluation was stopped when the measured value of the contact angle became to be less than 100 degree. It is noted that for Example 2, the evaluation was stopped at 20,000 shuttles because of abrasion of the steel wool. The results are shown in the following Table.

TABLE 3

|  | steel wool durability (times) | Proportion of the compound having a molecular weight of 3000 or less (mol %) |
| --- | --- | --- |
| Example 1 | 15,000 | 0.5 |
| Example 2 | 20,000 or more | 1.9 |
| Example 3 | 15,000 | 4.5 |
| Example 4 | 12,500 | 6.7 |
| Comparative Example 1 | 5,000 | 9.6 |
| Comparative Example 2 | 12,500 | 13.8 |
| Comparative Example 3 | 2,000 | 81.7 |
| Comparative Example 4 | 7,500 | 12.8 |

As understood from Table 3, it was confirmed that the surface-treating agents that the proportion of the compound having a molecular weight of 3000 or less was within the scope of the present invention (Examples 1-4) could provide excellent friction durability. On the other hand, the surface-treating agents (Comparative Examples 1-4) that the proportion of the compound having a molecular weight of 3000 or less was is higher than 9.0 mol % had less friction durability in comparison with the surface-treating agent of the present invention. Although the present invention is not bound to any theory, a reason for this is presumed as follows: when the proportion of the compound having a molecular weight of 3000 or less is too high, this compound having low molecular weight firstly binds to the base material, and inhibits the binding of the compound having high molecular weight and high function to the base material.

INDUSTRIAL APPLICABILITY

The present invention is suitably applied for forming a surface-treating layer on a surface of various base materials, in particular, an optical member in which transparency is required.

The invention claimed is:
1. A surface-treating agent comprising at least one perfluoro(poly)ether group containing silane compound of any of the formulae (A1), (A2), (B1), (B2), (C1) and (C2):

$$(Rf\text{---}PFPE)_{\alpha'}\text{---}X^1\text{---}((CH_2C)_t\text{---}R^{11})_\alpha \quad (A1)$$
$$\underset{X^2\text{---}SiR^1_nR^2_{3-n}}{\overset{R^{12}}{|}}$$

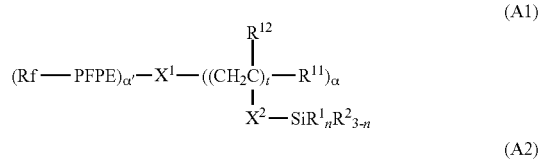

$$(Rf\text{---}PFPE)_{\beta'}\text{---}X^5\text{---}(SiR^1_nR^2_{3-n})_\beta \quad (B1)$$

$$(R^2_{3-n}R^1_nSi)_\beta\text{---}X^5\text{---}PFPE\text{---}X^5\text{---}(SiR^1_nR^2_{3-n})_\beta \quad (B2)$$

$$(Rf\text{---}PFPE)_{\gamma'}\text{---}X^7\text{---}(SiR^a_kR^b_lR^c_m)_\gamma \quad (C1)$$

$$(R^c_mR^b_lR^a_kSi)_\gamma\text{---}X^7\text{---}PFPE\text{---}X^7\text{---}(SiR^a_kR^b_lR^c_m)_\gamma \quad (C2)$$

wherein:
PFPE is each independently at each occurrence a group of the formula:
—(OC₄F₈)ₐ—(OC₃F₆)ᵦ—(OC₂F₄)ᵧ—(OCF₂)ᵨ— wherein a, b, c and d are each independently an integer of 0-200, the sum of a, b, c and d is 1 or more, and the occurrence order of the respective repeating units in parentheses with the subscript a, b, c or d is not limited in the formula;

Rf is each independently at each occurrence an alkyl group having 1-16 carbon atoms which may be substituted by one or more fluorine atoms;

$R^1$ is each independently at each occurrence a hydrogen atom or an alkyl group having 1-22 carbon atoms;

$R^2$ is each independently at each occurrence a hydroxyl group or a hydrolyzable group;

$R^{11}$ is each independently at each occurrence a hydrogen atom or a halogen atom;

$R^{12}$ is each independently at each occurrence a hydrogen atom or a lower alkyl group;

n is, independently per a unit (—SiR$^1_n$R$^2_{3-n}$), an integer of 0-3;

there is at least one $R^2$ in the formulae (A1), (A2), (B1) and (B2);

$X^1$ is each independently a single bond or a 2-10 valent organic group;

$X^2$ is each independently at each occurrence a single bond or a divalent organic group;

t is each independently at each occurrence an integer of 1-10;

α is each independently an integer of 1-9;
α' is each independently an integer of 1-9;
$X^5$ is each independently a single bond or a 2-10 valent organic group;
β is each independently an integer of 1-9;
β' is each independently an integer of 1-9;
$X^7$ is each independently a single bond or a 2-10 valent organic group;
γ is each independently an integer of 1-9;
γ' is each independently an integer of 1-9;
$R^a$ is each independently at each occurrence —Z—SiR$^{71}_p$R$^{72}_q$R$^{73}_r$;
Z is each independently at each occurrence an oxygen atom or a divalent organic group;
$R^{71}$ is each independently at each occurrence $R^{a'}$;
$R^{a'}$ has the same definition as that of $R^a$;
in $R^a$, the number of Si atoms which are straightly linked via the Z group is up to five;
$R^{72}$ is each independently at each occurrence a hydroxyl group or a hydrolyzable group;
$R^{73}$ is each independently at each occurrence a hydrogen atom or a lower alkyl group;
p is each independently at each occurrence an integer of 0-3;
q is each independently at each occurrence an integer of 0-3;
r is each independently at each occurrence an integer of 0-3;
in one $R^a$, the sum of p, q and r is 3, and there is at least one $R^{72}$ in the formula (C1) and C2);

$R^b$ is each independently at each occurrence a hydroxyl group or a hydrolyzable group;

$R^c$ is each independently at each occurrence a hydrogen atom or a lower alkyl group;

k is each independently at each occurrence an integer of 1-3;

l is each independently at each occurrence an integer of 0-2;

m is each independently at each occurrence an integer of 0-2;

the sum of k, l and m is 3 in each unit in parentheses with the subscript γ, wherein a proportion of the perfluoro(poly)ether group containing silane compound having a molecular weight of 3,000 or less in the perfluoro(poly)ether group containing silane compounds of any of the above general formulae is 9 mol % or less; and wherein the number average molecular weight of the perfluoro(poly)ether group containing silane compound of any of formulae (A1), (A2), (B1), (B2), (C1) and (C2) is 10,000 or less.

2. The surface-treating agent according to claim 1 wherein the proportion of the perfluoro(poly)ether group containing silane compound having a molecular weight of 3,000 or less in the perfluoro(poly)ether group containing silane compounds of any of the above general formulae is 7 mol % or less.

3. The surface-treating agent according to claim 1 wherein the proportion of the perfluoro(poly)ether group containing silane compound having a molecular weight of 3,000 or less in the perfluoro(poly)ether group containing silane compounds of any of the above general formulae is 5 mol % or less.

4. The surface-treating agent according to claim 1 wherein Rf is a perfluoroalkyl group having 1-16 carbon atoms.

5. The surface-treating agent according to claim 1 wherein PFPE is a group of any of the following formulas (i) to (iv):

$$-(OCF_2CF_2CF_2)_b- \quad \text{(i)}$$

wherein b is an integer of 1-200;

$$-(OCF(CF_3)CF_2)_b- \quad \text{(ii)}$$

wherein b is an integer of 1-200;

$$-(OCF_2CF_2CF_2CF_2)_a-(OCF_2CF_2CF_2)_b-(OCF_2CF_2)_c-(OCF_2)_d- \quad \text{(iii)}$$

wherein a and b are each independently 0 or an integer of 1-30, c and d are each independently an integer of 1-200, and the occurrence order of the respective repeating units in parentheses with the subscript a, b, c or d is not limited in the formula;

or $$-(OC_2F_4-R^8)_f- \quad \text{(iv)}$$

wherein $R^8$ is a group selected from $OC_2F_4$, $OC_3F_6$ and $OC_4F_8$; and f is an integer of 2-100.

6. The surface-treating agent according to claim 1 wherein $X^1$, $X^5$ and $X^7$ are each independently a 2-4 valent organic group, α, β and γ are each independently 1-3, and α', β' and γ' are 1.

7. The surface-treating agent according to claim 1 wherein $X^1$, $X^5$ and $X^7$ are a divalent organic group, α, β and γ are 1, and α', β' and γ' are 1.

8. The surface-treating agent according to claim 7 wherein $X^1$, $X^5$ and $X^7$ are each independently $-(R^{31})_{p'}-(X^a)_{q'}-$ wherein:

$R^{31}$ is a single bond, $-(CH_2)_{s'}-$ (wherein s' is an integer of 1-20) or a o-, m- or p-phenylene group;

$X^a$ is $-(X^b)_{l'}-$ (wherein l' is an integer of 1-10);

$X^b$ is each independently at each occurrence selected from the group consisting of $-O-$, $-S-$, an o-, m- or p-phenylene group, $-C(O)O-$, $-Si(R^{33})_2-$, $-(Si(R^{33})_2O)_{m'}-Si(R^{33})_2-$ (wherein m' is an integer of 1-100), $-CONR^{34}-$, $-O-CONR^{34}-$, $-NR^{34}-$ and $-(CH_2)_{n'}-$ (wherein n' is an integer of 1-20);

$R^{33}$ is each independently at each occurrence a phenyl group, a $C_{1-6}$ alkyl group or a $C_{1-6}$ alkoxy group;

$R^{34}$ is each independently at each occurrence a hydrogen atom, a phenyl group or a $C_{1-6}$ alkyl group;

p' is 0 or 1;

q' is 0 or 1;

at least one of p' and q' is 1, the occurrence order of the respective repeating units in parentheses with the subscript p' or q' is not limited in the formula; and $R^{31}$ and $X^a$ is may be substituted with one or more substituents selected from a fluorine atom, a $C_{1-3}$ alkyl group and a $C_{1-3}$ fluoroalkyl group.

9. The surface-treating agent according to claim 7 wherein $X^1$, $X^5$ and $X^7$ are each independently selected from the group consisting of:

—CH$_2$O(CH$_2$)$_2$—,
—CH$_2$O(CH$_2$)$_3$—,
—CH$_2$O(CH$_2$)$_6$—,
—CH$_2$O(CH$_2$)$_3$Si(CH$_3$)$_2$OSi(CH$_3$)$_2$(CH$_2$)$_2$—,
—CH$_2$O(CH$_2$)$_3$Si(CH$_3$)$_2$OSi(CH$_3$)$_2$OSi(CH$_3$)$_2$(CH$_2$)$_2$—,
—CH$_2$O(CH$_2$)$_3$Si(CH$_2$)$_2$O(Si(CH$_3$)$_2$O)Si(CH$_3$)$_2$(CH$_2$)$_2$—,
—CH$_2$O(CH$_2$)$_3$Si(CH$_3$)$_2$O(Si(CH$_3$)$_2$O)$_3$Si(CH$_3$)$_2$(CH$_2$)$_2$—,
—CH$_2$O(CH$_2$)$_3$Si(CH$_3$)$_2$O(Si(CH$_3$)$_2$O)$_{10}$Si(CH$_3$)$_2$(CH$_2$)$_2$—,
—CH$_2$O(CH$_2$)$_3$Si(CH$_3$)$_2$O(Si(CH$_3$)$_2$O)$_{20}$Si(CH$_3$)$_2$(CH$_2$)$_2$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—
—CH$_2$OCH$_2$(CH$_2$)$_7$CH$_2$Si(OCH$_3$)$_2$OSi(OCH$_3$)$_2$(CH$_2$)$_2$Si(OCH$_3$)$_2$OSi(OCH$_3$)$_2$(CH$_2$)$_2$—,
—CH$_2$OCH$_2$CH$_2$CH$_2$Si(OCH$_3$)$_2$OSi(OCH$_3$)$_2$(CH$_2$)$_3$—,
—CH$_2$OCH$_2$CH$_2$CH$_2$Si(OCH$_2$CH$_3$)$_2$OSi(OCH$_2$CH$_3$)$_2$(CH$_2$)$_3$—,
—CH$_2$OCH$_2$CH$_2$Si(OCH$_3$)$_2$OSi(OCH$_3$)$_2$(CH$_2$)$_2$—,
—CH$_2$OCH$_2$CH$_2$Si(OCH$_2$CH$_3$)$_2$Si(OCH$_2$CH$_3$)$_2$(CH$_2$)$_2$—,
—(CH$_2$)$_2$—,
—(CH$_2$)$_3$—,
—(CH$_2$)$_4$—,

—(CH$_2$)$_6$—,
—(CH$_2$)$_2$—Si(CH$_3$)$_2$(CH$_2$)$_2$—,
—CONH—(CH$_2$)$_3$—,
—CON(CH$_3$)—(CH$_2$)$_3$—,
—CON(Ph)-(CH$_2$)$_3$— (wherein Ph is phenyl),
—CONH—(CH$_2$)$_6$—,
—CON(CH$_3$)—(CH$_2$)$_6$—,
—CON(Ph)-(CH$_2$)$_6$— (wherein Ph is phenyl),
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—S—(CH$_2$)$_3$—,
—(CH$_2$)$_2$S(CH$_2$)$_3$,
—CONH—(CH$_2$)$_3$Si(CH$_3$)$_2$OSi(CH$_3$)$_2$(CH$_2$)$_2$—,
—CONH—(CH$_2$)$_3$Si CH$_3$)$_2$OSi(CH$_3$)$_2$OSi(CH$_3$)$_2$ (CH$_2$)$_2$—,
—CONH—(CH$_2$)$_3$Si(CH$_3$)$_2$O(Si(CH$_3$)$_2$O)$_2$Si(CH$_3$)$_2$ (CH$_2$)$_2$—,
—CONH—(CH$_2$)$_3$Si(CH$_3$)$_2$O(Si(CH$_3$)$_2$O)$_3$Si(CH$_3$)$_2$ (CH$_2$)$_2$—,
—CONH—(CH$_2$)$_3$Si(CH$_3$)$_2$O(Si(CH$_3$)$_2$O)$_{10}$Si(CH$_3$)$_2$ (CH$_2$)$_2$—,
—CONH—(CH$_2$)$_3$Si(CH$_3$)$_2$O(Si(CH$_3$)$_2$O)$_{20}$Si(CH$_3$)$_2$ (CH$_2$)$_2$—,
—C(O)O—(CH$_2$)$_3$,
—C(O)O—(CH$_2$)$_6$—,
—CH$_2$—O—(CH$_2$)$_3$—Si(CH$_3$)$_2$—(CH$_2$)$_2$—Si(CH$_3$)$_2$— (CH$_2$)$_2$—,
—CH$_2$—O—(CH$_2$)$_3$—Si(CH$_3$)—(CH$_2$)$_2$—Si(CH$_3$)$_2$— CH(CH$_3$)—,
—CH$_2$—O—(CH$_2$)$_3$—Si(CH$_3$)$_2$—(CH$_2$)$_2$—Si(CH$_3$)$_2$— (CH$_2$)$_3$—,
—CH$_2$—O—(CH$_2$)$_3$—Si(CH$_3$)$_2$—(CH$_2$)$_2$—Si(CH$_3$)$_2$— CH(CH$_3$)—CH$_2$—,

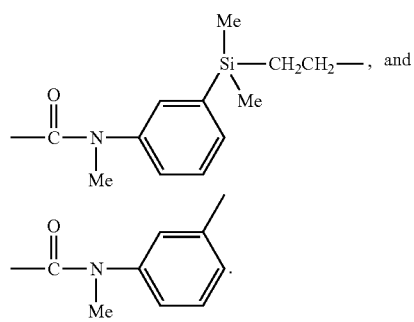
and

10. The surface-treating agent according to claim 1 wherein
X$^1$ is —O—CFR$^{13}$—(CF$_2$)$_e$—,
R$^{13}$ is a fluorine atom or a lower fluoroalkyl group, and
e is 0 or 1.

11. The surface-treating agent according to claim 1 wherein
X$^2$ is —(CH$_2$)$_s$—, and
s is an integer of 0-2.

12. The surface-treating agent according to claim 1 wherein k is 3, and q is 3 in R$^a$.

13. The surface-treating agent according to claim 1 wherein X$^1$, X$^5$ and X$^7$ are each independently a 3-10 valent organic group.

14. The surface-treating agent according to claim 13 wherein X$^1$, X$^5$ and X$^7$ are each independently selected from the group consisting of:

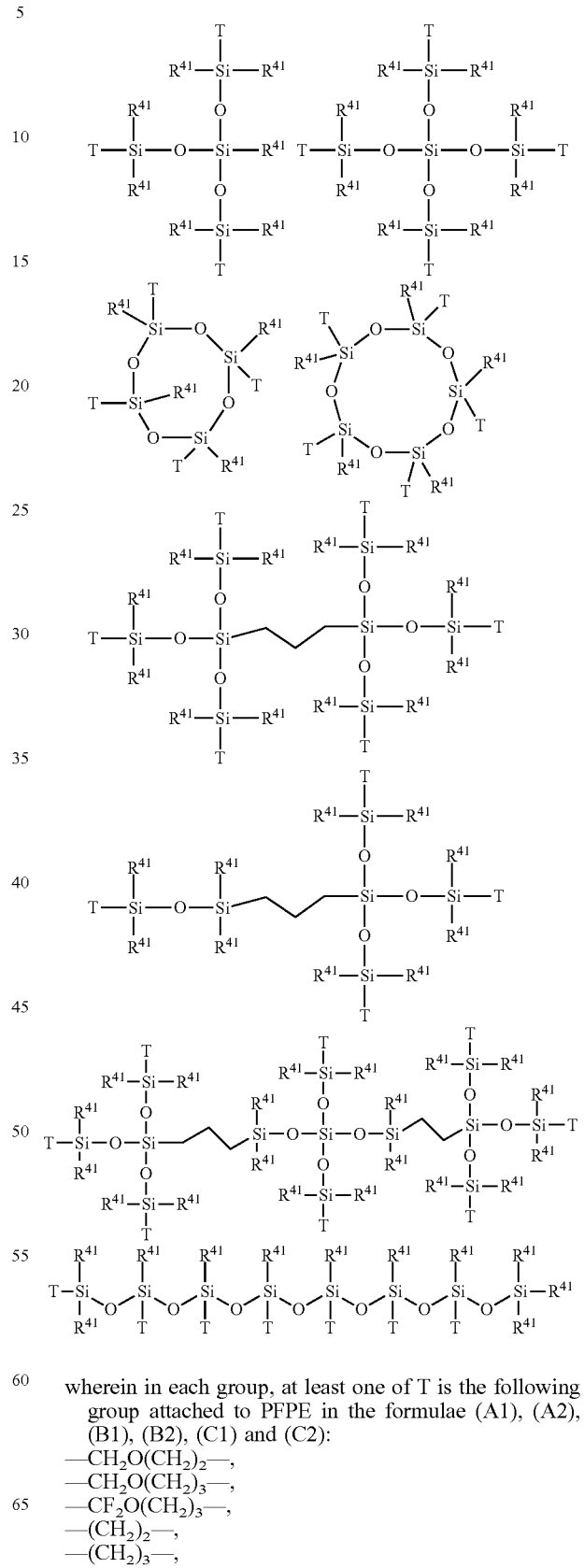

wherein in each group, at least one of T is the following group attached to PFPE in the formulae (A1), (A2), (B1), (B2), (C1) and (C2):
—CH$_2$O(CH$_2$)$_2$—,
—CH$_2$O(CH$_2$)$_3$—,
—CF$_2$O(CH$_2$)$_3$—,
—(CH$_2$)$_2$—,
—(CH$_2$)$_3$—, —(CH$_2$)$_4$—,
—CONH—(CH$_2$)$_3$—,
—CON(CH$_3$)—(CH$_2$)$_3$—,
—CON(Ph)-(CH$_2$)$_3$— (wherein Ph is a phenyl group), and

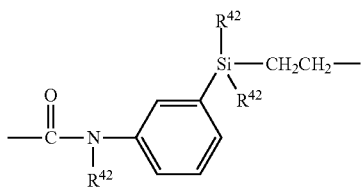

at least one of the other T is —(CH$_2$)$_n$— (wherein n is an integer of 2-6) attached to the carbon atom or the Si atom in the formulae (A1), (A2), (B1), (B2), (C1) and (C2) and the others are each independently a methyl group, a phenyl group, a alkoxy having 1-6 carbon atoms, or a radical scavenger group or an ultraviolet ray absorbing group, R$^{41}$ is each independently a hydrogen atom, a phenyl group, an alkoxy group having 1 to 6 carbon atoms or an alkyl group having 1 to 6 carbon atoms, and R$^{42}$ is each independently a hydrogen atom, a C$_{1-6}$ alkyl group or a C$_{1-6}$ alkoxy group.

15. The surface-treating agent according to claim 1 wherein the perfluoro(poly)ether group containing silane compound is at least one compound of any of the formulae (A1) and (A2).

16. The surface-treating agent according to claim 1 wherein the perfluoro(poly)ether group containing silane compound is at least one compound of any of the formulae (B1) and (B2).

17. The surface-treating agent a claim 1 wherein the perfluoro(poly)ether group containing silane compound is at least one compound of any of the formulae (C1) and (C2).

18. The surface-treating agent according to claim 1 further comprising one or more components selected form a fluorine-containing oil, a silicone oil and a catalyst.

19. The surface-treating agent according to claim 18 wherein the fluorine-containing oil is one or more compounds of the formula (3):

$$R^{21}\text{—}(OC_4F_8)_{a'}\text{—}(OC_3F_6)_{b'}\text{—}(OC_2F_4)_{c'}\text{—}(OCF_2)_{d'}\text{—}R^{22} \quad (3)$$

wherein:
R$^{21}$ is an alkyl group having 1-16 carbon atoms which may be substituted by one or more fluorine atoms;
R$^{22}$ is an alkyl group having 1-16 carbon atoms which may be substituted by one or more fluorine atoms, a fluorine atom or a hydrogen atom; and
a', b', c' and d' are the repeating number of each of four repeating units of perfluoro(poly)ether which constitute a main backbone of the polymer, and are each independently an integer of 0 or more and 300 or less, the sum of a', b', c' and d' is 1 or more, and the occurrence order of the respective repeating units in parentheses with the subscript a', b', c' and d' is not limited in the formula.

20. The surface-treating agent according to claim 18 wherein the fluorine-containing oil is one or more compounds of the formula (3a) or (3b):

$$R^{21}\text{—}(OCF_2CF_2CF_2)_{b''}\text{—}R^{22} \quad (3a)$$

$$R^{21}\text{—}(OCF_2CF_2CF_2)_{a''}\text{—}(OCF_2CF_2CF_2)_{b''}\text{—}(OCF_2CF_2)_{c''}\text{—}(OCF_2)_{d''}\text{—}R^{22} \quad (3b)$$

wherein:
R$^{21}$ is an alkyl group having 1-16 carbon atoms which may be substituted by one or more fluorine atoms;
R$^{22}$ is an alkyl group having 1-16 carbon atoms which may be substituted by one or more fluorine atoms, a fluorine atom or a hydrogen atom;
in the formula (3a), b'' is an integer of 1 or more and 100 or less;
in the formula (3b), a'' and b'' are each independently an integer of 0 or more and 30 or less, and c'' and d'' are each independently an integer of 1 or more and 300 or less; and
the occurrence order of the respective repeating units in parentheses with the subscript a'', b'', c'' or d'' is not limited in the formula.

21. The surface-treating agent according to claim 20 wherein a mass ratio of the perfluoro(poly)ether group containing silane compound and the compound of the formula (3b) is 10:1-1:10.

22. The surface-treating agent according to claim 20 wherein a mass ratio of the perfluoro(poly)ether group containing silane compound and the compound of the formula (3b) is 4:1-1:4.

23. The surface-treating agent according to claim 20 wherein the compound of the formula (3a) has a number average molecular weight of 2,000-8,000.

24. The surface-treating agent according to claim 20 wherein the compound of the formula (3b) has a number average molecular weight of 8,000-30,000.

25. The surface-treating agent according to claim 20 wherein the compound of the formula (3b) has a number average molecular weight of 3,000-8,000.

26. The surface-treating agent according to claim 1 further comprising a solvent.

27. The surface-treating agent according to claim 1 which is used as an antifouling-coating agent or a water-proof coating agent.

28. The surface-treating agent according to claim 1 for vacuum deposition.

29. A pellet comprising the surface-treating agent according to claim 1.

30. An article comprising a base material and a layer which is formed on a surface of the base material from the surface-treating agent according to claim 1.

31. The article according to claim 30 wherein the base material is a glass or a sapphire glass.

32. The article according to claim 31 wherein the glass is a glass selected from the group consisting of a soda-lime glass, an alkali aluminosilicate glass, a borosilicate glass, a non-alkaline glass, a crystal glass, and a quartz glass.

33. The article according to claim 30 wherein the article is an optical member.

34. The article according to claim 30 wherein the article is a display.

* * * * *